(12) United States Patent
Nakane

(10) Patent No.: US 8,260,123 B2
(45) Date of Patent: Sep. 4, 2012

(54) INFORMATION DISTRIBUTING METHOD, INFORMATION RECORDING METHOD, INFORMATION REPRODUCING METHOD, AND INFORMATION RECORDING MEDIUM

(75) Inventor: Kazuhiko Nakane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 403 days.

(21) Appl. No.: 12/528,477

(22) PCT Filed: Feb. 13, 2008

(86) PCT No.: PCT/JP2008/052322
§ 371 (c)(1),
(2), (4) Date: Aug. 25, 2009

(87) PCT Pub. No.: WO2008/105236
PCT Pub. Date: Sep. 4, 2008

(65) Prior Publication Data
US 2010/0098390 A1    Apr. 22, 2010

(30) Foreign Application Priority Data

Feb. 27, 2007 (JP) ................................. 2007-046912

(51) Int. Cl.
*H04N 5/92* (2006.01)
*H04N 5/917* (2006.01)
*H04N 5/84* (2006.01)
*H04N 5/89* (2006.01)

(52) U.S. Cl. ........ 386/326; 386/330; 386/332; 386/334; 386/336

(58) Field of Classification Search .................. 386/326, 386/330, 332, 334, 336
See application file for complete search history.

(56) References Cited

U.S. PATENT DOCUMENTS 6,377,524 B1 * 4/2002 Ko .............................. 369/47.14
(Continued)

FOREIGN PATENT DOCUMENTS

JP    8-273304 A    10/1996
(Continued)

OTHER PUBLICATIONS

ECMA, Standardizing Information and Communication Systems, 120 mm DVD-Read-Only Disk, Standard ECMA-267, $3^{rd}$ Edition, Apr. 2001.

*Primary Examiner* — Daquan Zhao
(74) *Attorney, Agent, or Firm* — Birch, Stewart, Kolasch & Birch, LLP

(57) ABSTRACT

In a system in which DVD contents authored in the past is to be downloaded and saved into a recording disk, such DVD contents are authored in such manner that they can be recorded into the recording disk without being re-authored, and copyright protection of the downloaded DVD contents can be strengthened. In this system, a disk image file is produced including data to be handled as main data among sectors, and header information of each of the sectors. The data of the DVD contents is divided into packets of a transport stream, and identification codes for the content and for a distribution destination of the content are added to each of the packets, thus enabling identification on a basis of the individual sectors. In a recording apparatus, the DVD contents can be recorded into a large-capacity optical disk or a hard disk based on these identification codes.

9 Claims, 15 Drawing Sheets

| Control-Byte Area (5th-8th bytes) | Definition |
|---|---|
| e1.5 – e1.8 | Content-Provider Identification Code |
| e2.5 – e2.8 | Content-Title Identification Code |
| e3.5 – e3.8 | Content Distribution-Process Identification Code (#1) |
| e4.5 – e4.8 | Content Distribution-Process Identification Code (#2) |
| e5.5 – e5.8 | Content Distribution-Process Identification Code (#3) |
| e6.5 – e6.8 | Content Distribution-Process Identification Code (#4) |
| e7.5 – e7.8 | Content Distribution-Process Identification Code (#5) |
| e8.5 – e8.8 | Content Distribution-Process Identification Code (#6) |
| e9.5 – e9.8 | Modification Detection Code (#1) |
| e10.5 – e10.8 | Modification Detection Code (#2) |
| e11.5 – e11.8 | Modification Detection Code (#3) |
| e12.5 – e12.8 | Modification Detection Code (#4) |

U.S. PATENT DOCUMENTS

| | | |
|---|---|---|
| 6,618,396 B1 | 9/2003 | Kondo et al. |
| 6,690,527 B1 | 2/2004 | Nonaka et al. |
| 7,043,139 B1 | 5/2006 | Schiller et al. |
| 7,106,946 B1 | 9/2006 | Kato |
| 7,236,687 B2 * | 6/2007 | Kato et al. ................ 386/248 |
| 7,835,629 B2 * | 11/2010 | Seo et al. ................ 386/243 |
| 2004/0019681 A1 | 1/2004 | Nakamura et al. |
| 2004/0024956 A1 * | 2/2004 | Muramatsu ................ 711/103 |
| 2004/0208135 A1 | 10/2004 | Nakamura et al. |
| 2005/0094516 A1 | 5/2005 | Morimoto et al. |
| 2005/0265700 A1 | 12/2005 | Kato |
| 2006/0291815 A1 | 12/2006 | Kato |
| 2007/0110227 A1 * | 5/2007 | Yokouchi ................ 380/28 |

FOREIGN PATENT DOCUMENTS

| | | |
|---|---|---|
| JP | 9-298737 A | 11/1997 |
| JP | 11-177581 A | 7/1999 |
| JP | 2001-160262 A | 6/2001 |
| JP | 2001-167528 A | 6/2001 |
| JP | 2002-524815 A | 8/2002 |
| JP | 2003-123392 A | 4/2003 |
| JP | 2003-151222 A | 5/2003 |
| JP | 2004-88766 A | 3/2004 |
| JP | 2005-92830 A | 4/2005 |
| JP | 2005-135513 A | 5/2005 |
| JP | 2005-513936 A | 5/2005 |
| JP | 2005-159703 A | 6/2005 |
| JP | 2006-319518 A | 11/2006 |
| JP | 2007-13805 A | 1/2007 |
| JP | 2007-48297 A | 2/2007 |
| WO | WO-97/14147 A1 | 4/1997 |

* cited by examiner

FIG.13

|  | Control-Byte Data (4 bytes) | Control-Byte Data (4 bytes) | Control-Byte Data (4 bytes) | Control-Byte Data (4 bytes) |
| --- | --- | --- | --- | --- |
| Byte Name | | | | |
| e1: | e1.1 — e1.4 | e1.5 — e1.8 | e1.9 — e1.12 | e1.13 — e1.16 |
| e2: | e2.1 — e2.4 | e2.5 — e2.8 | e2.9 — e2.12 | e2.13 — e2.16 |
| e3: | e3.1 — e3.4 | e3.5 — e3.8 | e3.9 — e3.12 | e3.13 — e3.16 |
| e4: | e4.1 — e4.4 | e4.5 — e4.8 | e4.9 — e4.12 | e4.13 — e4.16 |
| e5: | e5.1 — e5.4 | e5.5 — e5.8 | e5.9 — e5.12 | e5.13 — e5.16 |
| e6: | e6.1 — e6.4 | e6.5 — e6.8 | e6.9 — e6.12 | e6.13 — e6.16 |
| e7: | e7.1 — e7.4 | e7.5 — e7.8 | e7.9 — e7.12 | e7.13 — e7.16 |
| e8: | e8.1 — e8.4 | e8.5 — e8.8 | e8.9 — e8.12 | e8.13 — e8.16 |
| e9: | e9.1 — e9.4 | e9.5 — e9.8 | e9.9 — e9.12 | e9.13 — e9.16 |
| e10: | e10.1 — e10.4 | e10.5 — e10.8 | e10.9 — e10.12 | e10.13 — e10.16 |
| e11: | e11.1 — e11.4 | e11.5 — e11.8 | e11.9 — e11.12 | e11.13 — e11.16 |
| e12: | e12.1 — e12.4 | e12.5 — e12.8 | e12.9 — e12.12 | e12.13 — e12.16 |

For 1 Sector (16 bytes × 12 Lines = 192 bytes)

Data in Control-Byte Area (16 bytes per Line)

FIG.14

| Control-Byte Area (5th-8th bytes) | Definition |
|---|---|
| e1.5 - e1.8 | Content-Provider Identification Code |
| e2.5 - e2.8 | Content-Title Identification Code |
| e3.5 - e3.8 | Content Distribution-Process Identification Code (#1) |
| e4.5 - e4.8 | Content Distribution-Process Identification Code (#2) |
| e5.5 - e5.8 | Content Distribution-Process Identification Code (#3) |
| e6.5 - e6.8 | Content Distribution-Process Identification Code (#4) |
| e7.5 - e7.8 | Content Distribution-Process Identification Code (#5) |
| e8.5 - e8.8 | Content Distribution-Process Identification Code (#6) |
| e9.5 - e9.8 | Modification Detection Code (#1) |
| e10.5 - e10.8 | Modification Detection Code (#2) |
| e11.5 - e11.8 | Modification Detection Code (#3) |
| e12.5 - e12.8 | Modification Detection Code (#4) |

FIG.15

| Data Arrangement for DVD Contents | | | | | Arrangement on Large-capacity Optical Disk | |
|---|---|---|---|---|---|---|
| | No. | Sector Number | ECC Block Number | No. | No. | ECC Cluster Number |
| First-Layer Data Area | 1 | 30000h — 3000Fh | 3000h | 1 | 1 | 100000h |
| | | ... | ... | ... | ... | ... |
| | | 300F0h — 300FFh | 300Fh | 16 | 9 | 100008h |
| | 2 | 30100h — 3010Fh | 3010h | 17 | 10 | 100009h |
| | | ... | ... | ... | ... | ... |
| | | 301F0h — 301FFh | 301Fh | 32 | 18 | 100011h |
| | | 30200h — 3020Fh | 3020h | 33 | 19 | 100012h |
| | ... | ... | ... | ... | ... | ... |
| | | 233EF0h — 233EFFh | 233EFh | 132080 | 74295 | 112236h |
| | 8256 | 233F00h — 233F0Fh | 233F0h | 132081 | 74296 | 112237h |
| | | ... | ... | ... | ... | ... |
| | | 233FF0h — 233FFFh | 233FFh | 132096 | 74304 | 11223Fh |
| Second-Layer Data Area | 8257 | DCC000h — DCC00Fh | DCC00h | 132097 | 74305 | 112240h |
| | | ... | ... | ... | ... | ... |
| | | DCC0F0h — DCC0FFh | DCC0Fh | 132112 | 74313 | 112248h |
| | ... | ... | ... | ... | ... | ... |
| | 16512 | FCFF00h — FCFF0Fh | FCFF0h | 264177 | 148600 | 124477h |
| | | ... | ... | ... | ... | ... |
| | | FCFFF0h — FCFFFFh | FCFFFh | 264192 | 148608 | 12447Fh |

INFORMATION DISTRIBUTING METHOD, INFORMATION RECORDING METHOD, INFORMATION REPRODUCING METHOD, AND INFORMATION RECORDING MEDIUM

TECHNICAL FIELD

The present invention relates to a method of recording and/or reproducing information, an information recording-reproducing apparatus, and an information recording medium, which facilitate recording on not only DVDs but also recording media other than DVDs when varied digital contents such as images and/or music are distributed by downloading and recorded into media obeying a DVD format.

BACKGROUND ART

In image storage products, large-capacity optical disks such as Blu-ray Discs or HD DVDs are realized as next-generation large-capacity DVDs that are larger in capacity than the current DVDs and capable of recording high-definition images for long hours, and then, the progress is made toward the high-definition images of packaged media. Moreover, in parallel with those, there are also movements to commence extending and/or shifting toward sales by download distribution from the sales schemes of DVDs conventionally provided by package sales. For the time being, the next-generation DVD of high definition may mainly exert sales by packaged media because of an enormous amount of data volume, and meanwhile, the download distribution heads mainly toward cultivating a new market due to extension of distribution channels for DVD contents (the content that is authored complying with the DVD format) of standard definition.

Due to the movements described above, it is required that a plurality of contents each conventionally accommodated in one DVD is allowed to be collectively accommodated in a next-generation large-capacity optical disk. In addition, distribution schemes include download distribution in which a DVD content is downloaded to a user so as to be directly recorded into a recordable large-capacity optical disk at home, and in a packaged supply in which a package is produced to accommodate a plurality of DVD contents in a large-capacity optical disk on the side of a content provider so as to be supplied, and a technology that can be applied to both the schemes is required to be put into practical use.

Under these circumstances, importance to be placed on in particular is copyright protection of the contents. When download distribution is performed by way of a network, a threat leading to an unauthorized copy of contents increases, so that technological countermeasures to this are required more than before.

Conventionally, as for DVD formats, an ISO/IEC Standard that is an international standard, and an ECMA Standard that has been the source thereof are known (for example, refer to Non-Patent Document 1, Non-Patent Document 2). In addition, in relation to image recording, a technology to record and/or reproduce image data including navigation data into/from a recording medium (for example, refer to Patent Document 1) and a copyright management system of contents (for example, refer to Patent Document 2) are known.

As a disk format technology for a next-generation large-capacity optical disk, an error-correction cluster configuration method (for example, refer to Patent Document 3), a technology to efficiently record and/or play back a transport stream when an image file is recorded into a disk (for example, refer to Patent Document 4), and a technology to transform at high speed by correlating a transport stream with a program stream using a relational expression (for example, refer to Patent Document 5) are known.

In addition, as technologies to perform download distribution of an image contents by way of a network, a technology in which download processing is performed by letting a content server send a download control file to the receiving side (for example, refer to Patent Document 6), and a management system of copyrights of contents (for example, refer to Patent Document 7) are known.

[Non-Patent Document 1] ISO/IEC 16448
[Non-Patent Document 2] ECMA-267
[Patent Document 1] Japanese Laid-Open Patent Publication No. H08-273304
[Patent Document 2] Japanese Laid-Open Patent Re-Publication WO97/14147
[Patent Document 3] Japanese Laid-Open Patent Publication No. 2003-123392
[Patent Document 4] Japanese Laid-Open Patent Publication No. 2001-167528
[Patent Document 5] Japanese Laid-Open Patent Publication No. 2005-513936
[Patent Document 6] Japanese Laid-Open Patent Publication No. 2005-159703
[Patent Document 7] Japanese Laid-Open Patent Publication No. 2005-092830

DISCLOSURE OF THE INVENTION

Problems to be Solved by the Invention

In conventional technologies, when contents for DVD packaged media authored in the past are recorded into a large-capacity optical disk, it is possible to record one title of content recorded in one DVD into one large-capacity optical disk; however under this situation, authoring is once again necessary so as to comply with a content format specified for the large-capacity optical disk, so that it is difficult to simply utilize resources of an enormous amount of existing contents already authored.

In particular, when download distribution is performed for contents that are to be recorded by a user-side recording apparatus, a user's workload and risks on copyright protection increase in order to include functions of format transformation and/or of re-authoring to be provided in the user-side recording apparatus, so that it becomes necessary to re-author for the large-capacity optical disk on a server's side, and then to distribute to conform to a disk on which the user intends to record. Because of these, reprocessing costs for the contents having been already authored would increase, resulting in preventing reuse of existing contents. In addition, it is inconvenient for the user that the disk to be recorded should be determined in advance to be whether a large-capacity optical disk or the current DVD at the stage when the user downloads the contents.

In addition, even when by using an advantage that the disk increases in capacity is utilized a plurality of titles of contents is recorded in one large-capacity optical disk, it is necessary to perform authoring once again so as to further augment a factor to conventionality in accordance with a combination of the contents to be recorded in the large-capacity optical disk. For this reason, costs to reprocess the contents increases similarly to the manners as described above, and what is more, it is not possible to freely combine and record the contents to be recorded in one large-capacity optical disk on a user's side.

As described above, it is difficult to reuse existing contents in conventional technologies, and also a user's degree of freedom is limited to a large extent.

The present invention has been directed at solving those problems, and an object is to enable utilizing for download distribution, without re-authoring, contents for DVD packaged media authored in the past existing in enormous volumes of resources.

In addition, another object is to enable recording a plurality of titles of contents for DVD packaged media that a user has downloaded, in a large-capacity optical disk.

In addition, another object is to enable operating download distribution even when a disk to be recorded is not determined to be whether a large-capacity optical disk or the current DVD at the stage when the user downloads the contents.

Moreover, another object is to enhance, also in the large-capacity optical disk in which a plurality of titles of DVD contents is recorded, an access capability at the time of content reproduction, and to enhance, in a case of performing various kinds of particular playback or reproduction, access capabilities such as speed and smoothness of "fast-forward" and "fast-backward," speed of a "skip" and a "jump," shortening of access time to the beginning of a desired portion, and the like.

Furthermore, another object is to strengthen copyright protection of the contents distributed by a download.

In more detail, when both of drives for a hard disk (HDD) and an optical disk are included in a configuration for a user-side recording apparatus, a system provides, in addition to a method of recording into the optical disk by a direct download, a method in which contents are first downloaded into the HDD for the time being; thus, it may be so arranged that a disk being ultimately recorded is not yet determined at the time point, and then, from among the contents recorded in the HDD for the time being, a content that the user has selected therefrom is only recorded into the current DVD or a large-capacity optical disk each being an optical disk targeted for recording. Moreover, a content format applied to the system is implemented.

At this time, a copyright-protection system CSS that is utilized for copyright protection of a DVD content is applied to the content to be downloaded, so that, in a case of recording into the current DVD, the recorded disk is enabled for playback using a current DVD playback apparatus. In addition, when one title or a plurality of titles selected from the contents having been downloaded are collectively recorded into one large-capacity optical disk, the recording is enabled only by a minimal transformation process. For this reason, the recording into the large-capacity optical disk is performed while the copyright-protection system CSS is kept applied thereto.

Moreover, it is realized that, with respect to the contents to be distributed by a download, added also to a format is control information that enables individual management for respective target users, while maintaining compatibility with those objects for the operations and the access capabilities described above.

Means for Solving the Problems

An information distributing method according to the present invention comprises, when data of a DVD content is transmitted to an information recording apparatus by way of a communications channel, the steps of: dividing data of each of sectors for the DVD content to be distributed on the basis of a unit to which an inner parity in an error correction code block complying with the DVD format is added; storing the divided data into transport stream packets together with a predetermined number of control bytes; and specifying and storing into the control bytes, a content identification code that enables uniquely identifying an attribute of the content, and a distribution-process identification code that enables individually identifying a content distribution-process performed; wherein the identification is made possible on a basis of the individual sectors for the DVD content, for the attribute of the content and for the content distribution-process.

In addition, in an information recording method according to the present invention, when data of a DVD content having been distributed by way of a communications channel is recorded into a recording medium, data of the DVD content to be recorded is divided into a plurality of transport stream packets so as to be stored; the transport stream packets each include the divided data of each of sectors for the DVD content, and a predetermined number of control bytes; and the control bytes include a content identification code that enables uniquely identifying the content, and a distribution-process identification code that enables individually identifying a content distribution-process performed, whereby the identification is made possible on a basis of the individual sectors for the DVD content, for an attribute of the content and for the content distribution-process.

In addition, the information recording method according to the present invention comprises, when the recording medium is a hard disk or a large-capacity optical disk, an arrangement step of correlating sectors for the DVD content with recording positions on the recording medium so that an integral number of error correction code blocks complying with the DVD format coincides with an integral number of units of error correction codes in the large-capacity optical disk, and an addition step of adding, to a predetermined area in the control bytes of the transport stream packets, the sector number of the individual sectors for the DVD content, and arrangement information for identifying the recording positions of the sectors on the recording medium; wherein the information related to the recording positions specified at the arrangement step is added to the predetermined area in the correlating control bytes at the addition step, and the transport stream packets are recorded into the recording medium.

In addition, an information recording medium according to the present invention comprises a large-capacity optical disk in which disk image data of a DVD content is recorded, wherein data of the DVD content is divided into a plurality of transport stream packets so as to be stored on the basis of a unit to which an inner parity in an error correction code block complying with the DVD format is added; the transport stream packets each include data produced by dividing data of each of sectors for the DVD content, and a predetermined number of control bytes; and a content identification code that enables uniquely identifying the content, a distribution-process identification code that enables individually identifying a content distribution-process performed, and a modification detection code produced from information including the distribution-process identification code are stored into the control bytes, so that the identification is made possible on a basis of the individual sectors for the DVD content, for an attribute of the content and for the content distribution-process.

In addition, an information recording medium according to the present invention comprises a large-capacity optical disk in which disk image data of a DVD content is recorded, wherein data of the DVD content is divided into a plurality of transport stream packets so as to be stored on the basis of a unit to which an inner parity in an error correction code block complying with the DVD format is added; the transport stream packets each include data produced by dividing data of each of sectors for the DVD content, and a predetermined number of control bytes; and the sector number of the individual sectors for the DVD content, and arrangement information for identifying recording positions of the sectors on the large-capacity optical disk are stored into the control bytes.

Effects of the Invention

According to the present invention described above, it becomes possible to utilize for a download distribution, without re-authoring, the contents for DVD packaged media authored in the past.

BRIEF DESCRIPTION OF DRAWINGS

FIG. 13 is a diagram showing a configuration of a control-byte area;

FIG. 14 is a diagram showing a configuration of identification codes in the control-byte area; and FIG. 15 is a diagram illustrating the correspondence relationship among sector numbers and ECC cluster numbers.

EXPLANATION OF NUMERALS AND SYMBOLS

"1" designates a content server;
"2," network;
"3," recording apparatus;
"4," control means;
"5," primary recording means;
"6," secondary recording means;
"11," content-1;
"19," content-n;
"50," hard disk;
"51," lead-in area;
"53," file-system-1 area;
"54," user-file area;
"58," file-system-2 area;
"59," lead-out area;
"60," optical disk device;
"70," DVD;
"71," lead-in area;
"72," data area;
"73," file-system-1 area;
"74," user-file area;
"78," file-system-2 area;
"79," lead-out area;
"80," physical sector;
"81," header area;
"82," main data;
"83," error detection code (EDC);
"84," sector number;
"85," sector;
"86," synchronization information (SYNC);
"87," error correction code (ECC);
"88," inner parity codes (PI);
"89," outer parity codes (PO);
"90," large-capacity optical disk;
"91," lead-in area;
"93," file-system-1 area;
"94," user-file area;
"98," file-system-2 area;
"99," lead-out area;
"100," index information file;
"110," disk-image-data file;
"111," disk-image-data file in lead-in area;
"112," disk-image-data file in data area;
"119," disk-image-data file in lead-out area;
"120," disk-image-data file;
"121," disk-image-data file in lead-in area;
"125," disk-image-data file in first-layer data area;
"126," disk-image-data file in second-layer data area;
"129," disk-image-data file in lead-out area;
"150," copyright-protection-information file-group;
"190," disk-image-data file;
"300," packets;
"310," source packets; and
"320," array units.

BEST MODE FOR CARRYING OUT THE INVENTION

Embodiment 1

Figure 1:
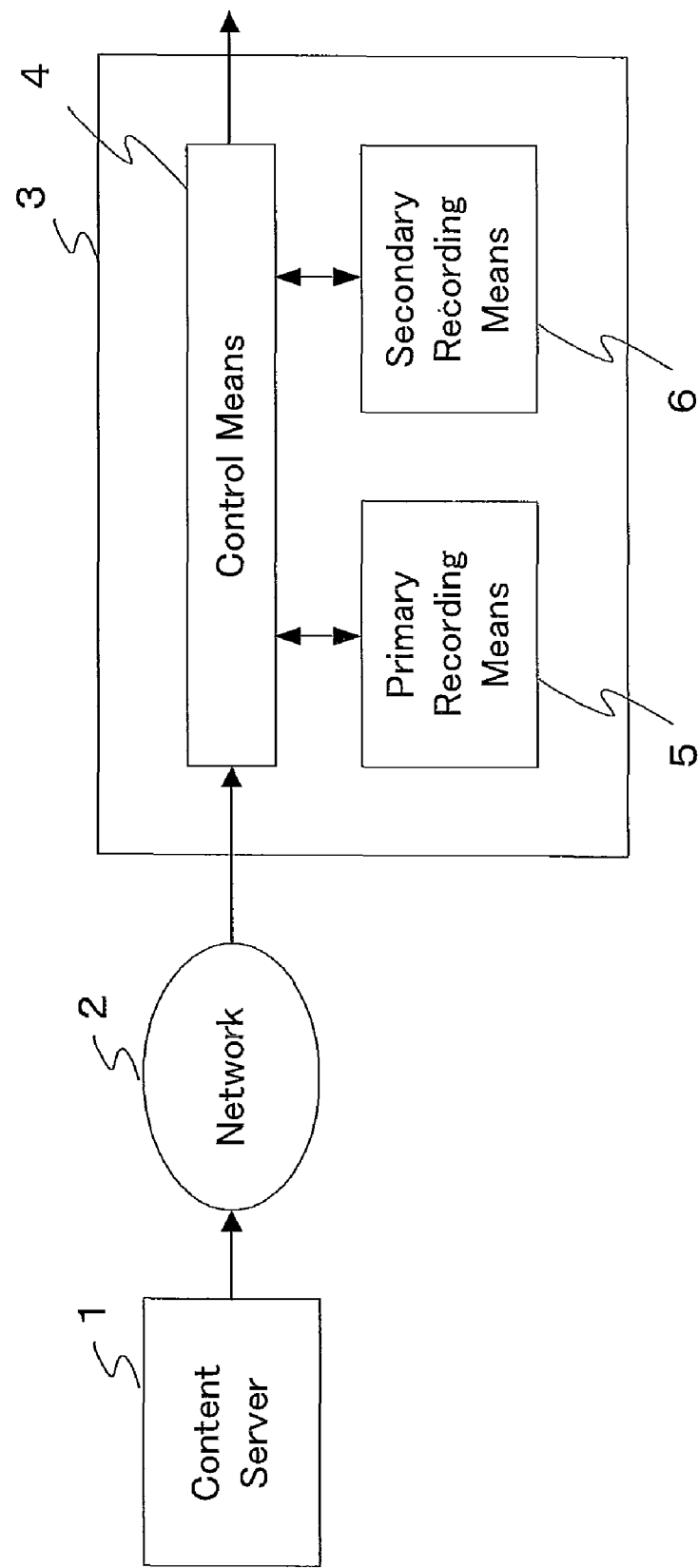
FIG. 1 is a diagram showing a configuration of a content download recording system in the present invention.

In FIG. 1, a configuration of a content download recording system in Embodiment 1 is shown for carrying out the present invention. In the figure, contents to be distributed are accumulated in a content server 1. Although not shown in the figure, a user specifies a content that should be downloaded for distribution from a user's recording apparatus 3 by way of a network 2 to the content server 1, using an appropriate user interface. In response to the specified request, the content server 1 transmits the content by way of the network 2 to the recording apparatus 3 when predetermined conditions such as user authentication and billing information are satisfied. In the inside of the user's recording apparatus 3, a control means 4 receives the content data from the network 2, and in the first place, records the data into a primary recording means 5. In a general apparatus, a hard disk is used for the primary recording means 5. The user can record a single or a plurality of contents desired from among the contents present in the content server 1 into the primary recording means 5.

The user specifies from among the contents having been recorded into the primary recording means 5 a desired content, which is then recorded into a secondary recording means 6 so as to be saved. The recording at this time may be, depending on conditions of usage of the content, a "copy" that the original data is left available for use in the primary recording means 5, or a "move" that the original data is not left in the primary recording means 5. A device that records onto interchangeable media is used for the secondary recording means 6. In the embodiment explained below, a current recordable DVD and a next-generation large-capacity optical disk are used as the interchangeable media, and the secondary recording means 6 is the device for driving these optical disks.

Note that, the recording system according to the present invention can be generally applied to a case in which a plurality of titles of DVD contents is recordable in a recording medium larger in capacity than a DVD. To this end, it may be adopted that a plurality of such secondary recording means 6 is included in the recording apparatus 3, and that one of them is for the recording apparatus with an optical disk including a current recordable DVD or a large-capacity optical disk, the other of them, with a recording medium other than optical disks, such as a semiconductor memory or a magnetic memory.

Recording of data into the primary recording means 5 may be temporary until the data is saved into the secondary recording means 6, or it may be so arranged that the contents can be available for playback on the primary recording means 5 until user's deletion.

Figure 2:
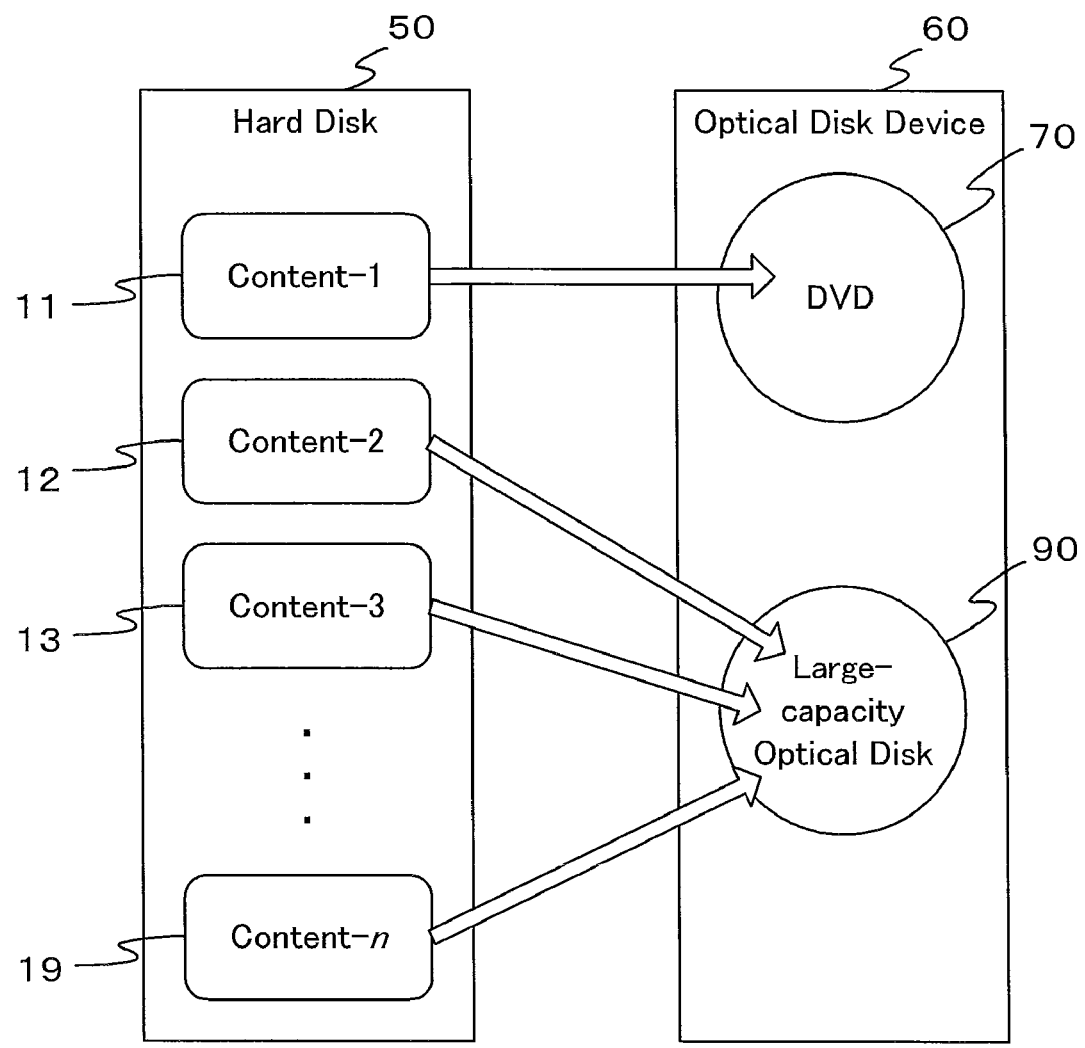
FIG. 2 is a diagram for explaining an appearance of recording contents.

In FIG. 2, an appearance is illustrated in which, from among n of contents from a "content-1" 11 to a "content-n" 19 recorded in a hard disk 50 that is the primary recording means, one content is selected for a DVD 70, or a plurality of contents is selected for a large-capacity optical disk 90, so as to be correspondingly recorded by an optical disk device 60. The contents described here are contents that are authored for the current DVD, so that image data, sound data, control data and the like are produced complying with the DVD content format. In order to make the explanation simple, the volume of one content is the amount that can be accommodated in one DVD.

Figure 3:
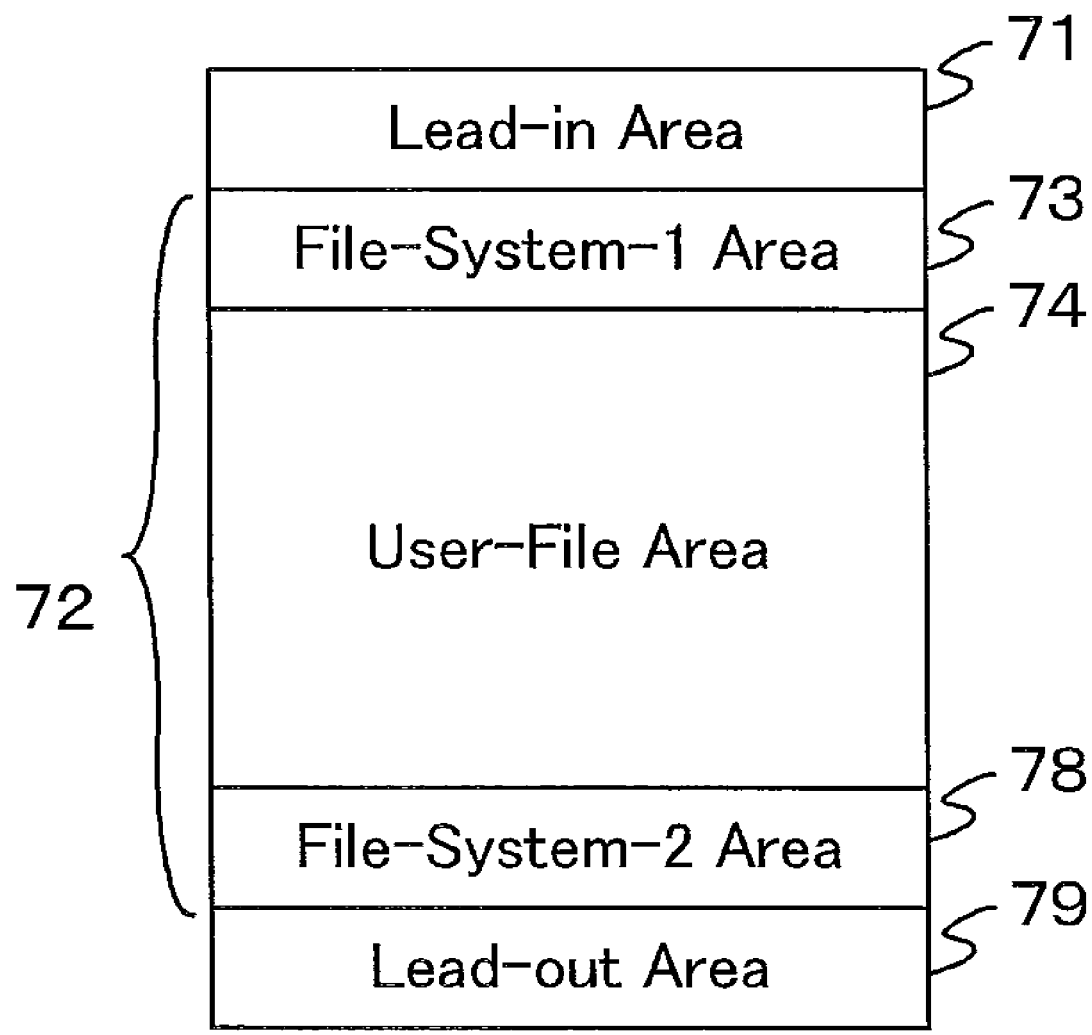
FIG. 3 is a diagram showing a data structure of a DVD content.

In FIG. 3, segmentation of areas each on the disk, and descriptions of data recorded in each of the areas are shown as a data structure when the data including a content is written into a DVD. A disk surface of the DVD is broadly segmented into a lead-in area 71, a data area 72 and a lead-out area 79, and further the data area 72 is segmented into a file-system-1 area 73, a user-file area 74 and a file-system-2 area 78.

In the lead-in area 71, in addition to control information that is required for the optical disk device to drive the DVD, information such as a cryptography key required for accessing a content is also recorded, when the content recorded in the user-file area 74 is encrypted by a copyright-protection system. In the user-file area 74, recorded are data of the content in the user-file area 74 including an encrypted portion, and information such as a cryptography key that is required for decrypting the encryption. In the file-system-1 area 73 and the file-system-2 area 78, recorded are the definition of the user-file area 74, and management data such as arrangement information of user files in the area, namely the information on a volume structure, a file structure and the like that constitute the file-system. Following the file-system-2 area 78, the lead-out area 79 is provided for a margin in case an optical head that read in the disk is deviated from the data area 72.

As described above, in the DVD, information required for content reproduction is distributionally held over the entire disk from the lead-in area 71 to the lead-out area 79, so that, as shown in FIG. 2, when the optical disk device 60 records the contents each into the DVD 70 or the large-capacity optical disk 90 each being a recording medium, data of the entire disk is required to be recorded. In a case of the DVD 70, the disk format is the same format as that of the content to be downloaded, so that it may be appropriately recorded without modification. In a case of the large-capacity optical disk 90, it is presumed here as the simplest way that the data of the entire disk is recorded into the large-capacity optical disk 90 as a disk image. At this time, a format of the content to be downloaded differs from a content format for the large-capacity optical disk, so that it cannot be handled without modification as the entire data for the large-capacity optical disk 90. For this reason, a transformation process that is required here is introduced.

Figure 4:
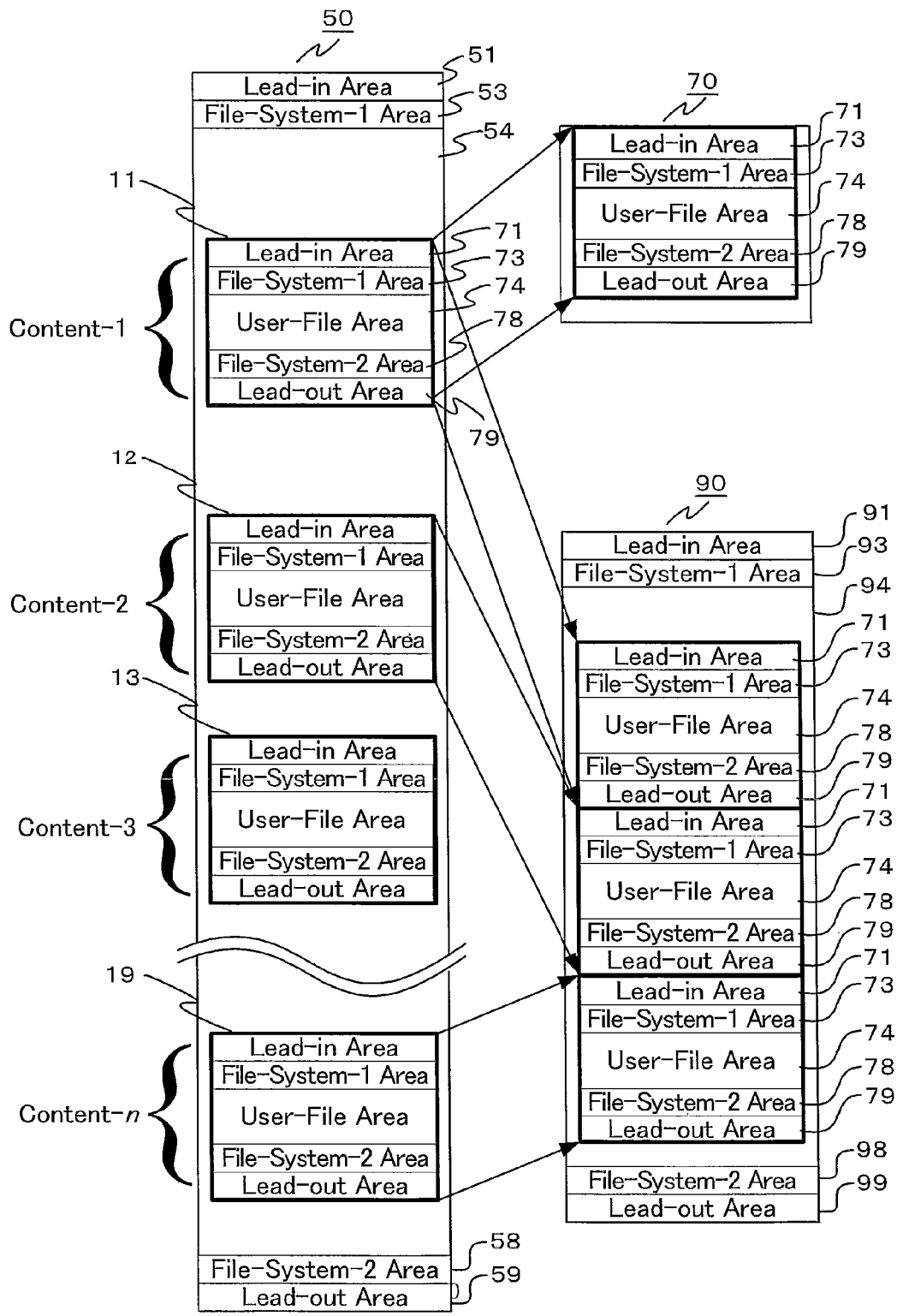
FIG. 4 is a diagram illustrating an arrangement of data on disks at the time of recording contents each.

In FIG. 4, an arrangement of data on the disks is illustrated when a plurality of contents as shown in FIG. 2 is recorded in the hard disk 50. In the hard disk 50, a lead-in area 51, a file-system-1 area 53, a file-system-2 area 58 and a lead-out area 59 are arranged for the management of the hard disk 50 itself, and recorded therein are information for the control means 4 to have an access to the hard disk 50, and information constituting the file-system to manage user files to be recorded into the hard disk 50.

In a user-file area 54, n contents from the "content-1" 11 to the "content-n" 19 are recorded. Each of the recorded contents has the individual data structure shown in FIG. 3. Although names of the areas each for the contents reaching the lead-in area 71 through the lead-out area 79 indicate respective descriptions as in the DVD format, all of them on the hard disk 50 are the data that is handled as user data of disk images written in the user-file area 54.

When, for example, the "content-1" 11 on the hard disk 50 is recorded into the DVD 70, pieces of information in the lead-in area 71, the file-system-1 area 73, the user-file area 74, the file-system-2 area 78 and the lead-out area 79 as a disk image are recorded into appropriate positions of a lead-in area, a file-system-1 area, a user-file area, a file-system-2 area and a lead-out area in the disk format of the DVD 70, respectively. As a result, a disk complying with the disk format of the DVD is finalized, and can be played back by a DVD playback apparatus.

In the large-capacity optical disk 90, a lead-in area 91, a file-system-1 area 93, a file-system-2 area 98 and a lead-out area 99 are arranged for the management of the disk itself, and recorded therein are information for the control means 4 to have an access to the large-capacity optical disk 90, and information constituting the file-system to manage user files to be recorded into the large-capacity optical disk 90.

When, for example, the "content-1" 11 is recorded into the large-capacity optical disk 90 on the hard disk 50, disk image data thereof is totally recorded into a user-file area 94 of the large-capacity optical disk 90. In a similar manner as the disk image data of the "content-1" 11, disk image data of the "content-2" 12 and disk image data of the "content-n" 19 are also recorded into the user-file area 94 of the large-capacity optical disk 90.

Figure 5:
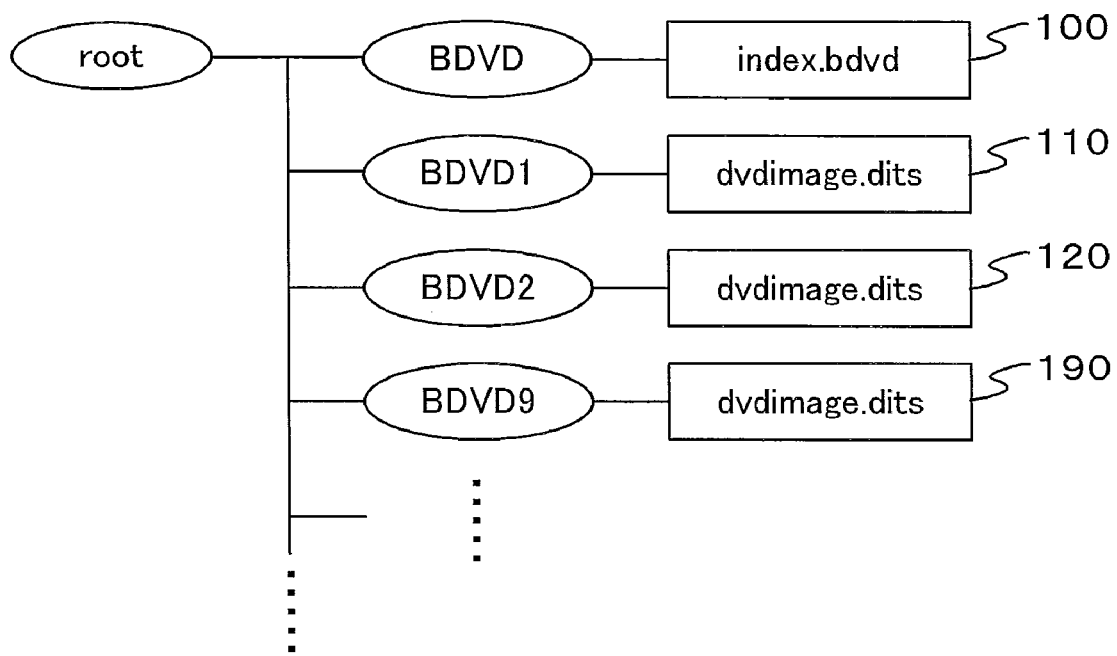
FIG. 5 is a diagram showing one example of a directory-file structure.

In FIG. 5, when disk image data of a plurality of DVD contents is recorded into the hard disk 50 and the large-capacity optical disk 90 as described above, one example of a directory-file structure on the disks each is shown. In order to accommodate data of the contents each collectively under the root directory, sub-directories are provided for respective the contents. A disk-image-data file "dvdimage.dits" 110 of the "content-1" 11 is placed under a sub-directory "BDVD1," a disk-image-data file "dvdimage.dits" 120 of the "content-2" 12, under a sub-directory "BDVD2," and a disk-image-data file "dvdimage.dits" 190 of the "content-n" 19, under a sub-directory "BDVD9," respectively.

In addition, a sub-directory "BDVD" is a sub-directory that contains an index information file "index.bdvd" 100 for managing information related to those pieces of disk image data and the sub-directories accommodating those, and is used to provide collected information related to recorded conditions of the contents when the user accesses the contents saved in the large-capacity optical disk 90.

As to the hard disk 50 and the large-capacity optical disk 90, a disk image file is commonly handled as data in the respective user-file areas, so that a similar file structure can be used as described above. When recording from the hard disk 50 to the large-capacity optical disk 90 is performed using the "copy" or the "move," it is possible to omit a transformation process at the time of the recording by taking the same file structure, so that the process can be simplified. Note that, in the large-capacity optical disk 90, because a main objective is to accommodate data of contents, sub-directories such as "BDVD" and "BDVD1" are placed directly under the root directory so that access paths to these pieces of information can be simplified; however, in the hard disk 50, it may be adopted that, depending on the convenience to design the control means 4, the sub-directories such as "BDVD" and "BDVD1" are not placed directly under the root directory, but collectively placed under another sub-directory in the hierarchical structure. If a file structure under that sub-directory is the same, similar effects capable of omitting the transformation process at the time of recording can be obtained.

In addition, the sub-directories are provided for the respective contents, which enables to handle them without changing a file name for pieces of the disk image data even when the file name "dvdimage.dits" is common to them. When the content server 1 downloads contents to users, all of the contents can be distributed to any of the users by the common file name of the disk image data, so that it becomes unnecessary to individually change the file name for its adjustment. As a result, a target file that should be handled can be easily identified by a playback apparatus for the large-capacity optical disk already recorded.

As for a form of disk image data, an example is shown in FIG. 5 in which the entire disk image data is included in a single file. In each disk image data file "dvdimage.dits" the image data of the entire disk areas of a DVD reaching the lead-in area 71 through the lead-out area 79 for each content is included in a collective manner. In the content server 1, it can be understood that the contents are in an early stage prepared for a download distribution for a DVD as a main objective, so that many of them are not prepared in the data format premised on the distribution for the large-capacity optical disk as presumed in the present invention. In this case, the structure such as the above is among the simplest. An advantage is that data related to the content for one DVD can be collectively managed as a single file.

Figure 6:
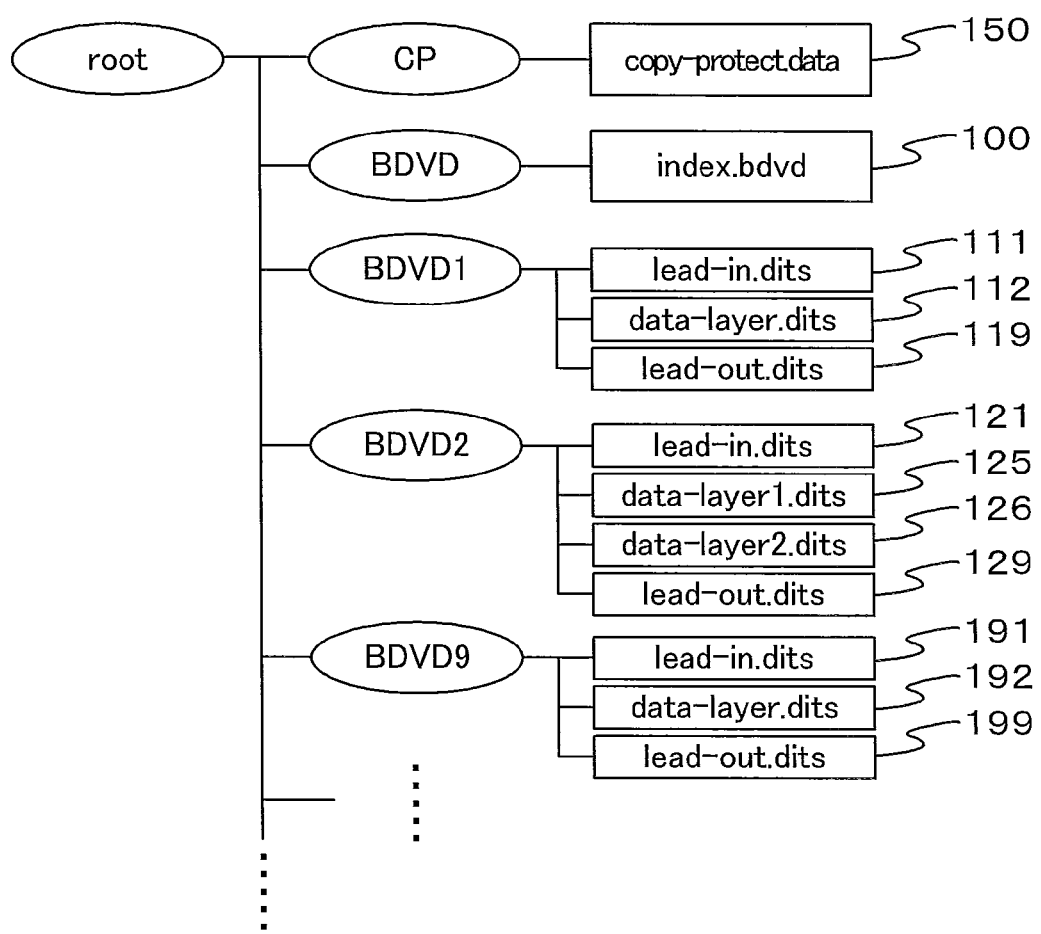
FIG. 6 is a diagram showing another example of a directory-file structure.

In FIG. 6, shown is another example of a directory-file structure on a disk on which disk image data is record. In order to collectively accommodate data of contents each under the root directory, the point that sub-directories are provided for the respective contents, and the point that a sub-directory "BDVD" is provided and an index information file "index.bdvd" 100 is provided under it are the same as those in FIG. 5.

In this example, the disk image data of the "content-1" 11 is placed under a sub-directory "BDVD1," but is divided into individual disk areas of a DVD in such a manner that disk-image-data in the lead-in area 71 is recorded in a file "lead-in.dits" 111, disk-image-data in the data area 72, in a file "data-layer.dits" 112, and disk-image-data in the lead-out area 79, in a file "lead-out.dits" 119.

As described above, by dividing into files for the respective areas, an access control for varied categories of information can be simplified at the time of the DVD content reproduction. First, at a startup time, data in the lead-in area 71 is read in from the "lead-in.dits" 111 so that only information required to access to the content is acquired. Next, data in the data area 72 is read in from the file "data-layer.dits" 112; file-access information is acquired from the data in the file-system-1 area 73 and the file-system-2 area 78; if required, information also referred to during the reproduction is held without modification in a memory of the control means 4; and then, data of the user-file area 74 is sequentially acquired to perform the content reproduction. Handling procedures such as these can be performed for individual files, so that the file management on the large-capacity optical disk 90 is simplified.

As for DVD types, there exist two types: a single-layer disk having only one recording layer, and a dual-layer disk having two layers. In FIG. 6, disk image data of the "content-2" 12 in the data area 72 is divided into a first-layer data and a second-layer data so that disk image data in a first-layer data area 72 is recorded as a file "data-layer1.dits" 125, and disk image data in a second-layer data area 72, as a file "data-layer2.dits" 126.

According to the manner described above, an access control can be taken using the files of the disk image data that is separated in the respective recording layers of the disk, so that the management of control information is made easy.

Note that, the disk-image-data of the "content-2" 12 in the lead-in area 71 is recorded in a file "lead-in.dits" 121, and the disk-image-data in the lead-out area 79, recorded in a file "lead-out.dits" 129. In addition, the disk-image-data of the "content-n" 19 is also divided into respective disk areas of the DVD, and is correspondingly recorded in a file "lead-in.dits" 191, a file "data-layer.dits" 192, and a file "lead-out.dits" 199.

The explanation will be made for copyright protection of contents. As to a recording medium for an image content, the copyright protection thereof is emphasized so that a copyright-protection system specified by standards is applied. A DVD content is protected by the copyright-protection system CSS, and a content of the large-capacity optical disk is protected by a stronger copyright-protection system AACS. However, technologies to invalidate the copyright protections and to improperly decode them also progress, so that, even for data of a conventional DVD content protected by the copyright-protection system CSS, the security is further enhanced by providing dual protection using the copyright-protection system AACS for the large-capacity optical disk. Also for the sake of a content provider, the needs to provide protection using the stronger system have grown when a plurality of existing DVD contents is collectively supplied as one large-capacity optical disk.

When a plurality of DVD contents is downloaded to the user's recording apparatus 3, they are separately recorded on a one-by-one basis into the hard disk 50. In addition, when recording from the hard disk 50 to such a large-capacity optical disk 90, the user specifies a desired content so as to be recorded thereinto, thereby it is convenient that the optical disk is left available so that contents can be further added at a later time. Therefore, it is required that copyright protection for use in the large-capacity optical disk is individually provided for every content recording.

FIG. 6 includes another directory-file structure for DVD contents for each of which copyright protection is provided for use in the large-capacity optical disk. Although there exists a plurality of files that stores information required for protecting the copyright, the files are collectively accommodated in FIG. 6 as a copyright-protection-information file-group "copy-protect.data" 150 under a copyright-protection-information sub-directory "CP" newly provided. The files of the disk image data placed under a sub-directory "BDVDn" (n is an integer) for the respective DVD contents are encrypted at the time of recording and are decrypted at the time of the playback or reproduction by applying thereto information of the copyright-protection-information file-group "copy-protect.data" 150; they are reproduced as DVD contents after decryption of the CSS has further been performed by the playback apparatus and/or playback software for the DVD at the time of the playback.

When the contents each are recorded from the hard disk 50 to the large-capacity optical disk 90, encryption on the hard disk 50 is once disengaged, and then, on the side of the optical disk device 60, an encryption process for the large-capacity optical disk 90 is performed for the recording thereinto. In addition, when a content is recorded from the hard disk 50 to the DVD 70, the encryption on the hard disk 50 is disengaged so as to leave in the state that protection by the CSS is only provided, and then the recording into the DVD 70 is performed by the optical disk device 60.

According to the structures, each of the recorded DVD contents is handled as one title in the format for the large-capacity optical disk, similarly to the contents each for other large-capacity optical disk. Commonality of the operations as to the contents is achieved, so that the system configuration and management are simplified.

In what follows, the explanation will be made for a method of recording disk image data of a DVD content by "packing" so that a recording unit on the disk for the large-capacity optical disk is made fit in alignment therewith as efficient as possible, and an access control to the data can be simplified.

Figure 7:
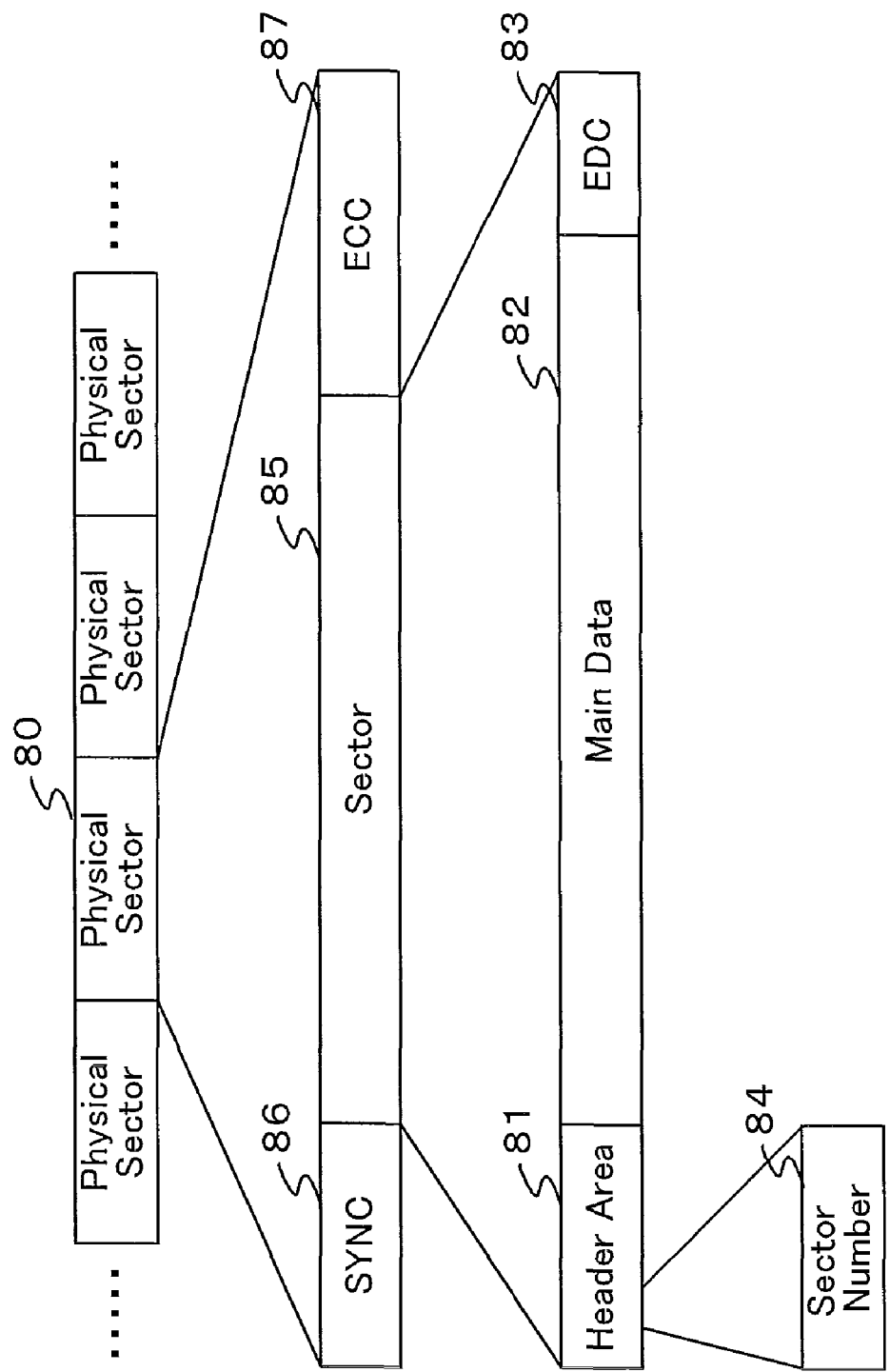
FIG. 7 is a diagram indicating a structure of sectors of a DVD.

In FIG. 7, a structure of sectors each as the minimum recording unit on the disk of a DVD is indicated. A recording track on the disk is constituted by physical sectors 80 that are successively connected. In the physical sectors 80 each, a significant data portion is called as a sector 85. The sector 85 has a header area 81 of twelve bytes at the front end, followed by main data 82 of 2048 bytes, and ends with an error detection code (EDC) 83 of four bytes. In the front-end portion of the header area 81, a sector number 84 is included. The sector length is 2064 bytes. In a general disk, user data is recorded into sectors each being an access unit for recording and/or playback by the number of power-of-two bytes such as 512 bytes, 1024 bytes or 2048 bytes. Also in a DVD and a large-capacity optical disk, a data frame length that is the recording unit is the same 2048 bytes as the main data 82. For the use of a usual data recording, only 2048-byte data being accommodated in the main data 82 is sufficient for recording user files also in the DVD. Note that FIG. 7 is a diagram that conceptually indicates byte numbers of elements each constituting the physical sectors 80; thus, an arrangement of data bytes on an actual disk is not as exact as those in FIG. 7.

However, as to the DVD contents, the header area 81 is used for control information so as to make "fast-forward" and "fast-backward" smooth by enhancing an access capability at the time of content reproduction and to enhance an access capability when various kinds of particular playback such as a "skip" or a "jump" are performed by speeding access to the beginning of a desired portion by acceleration, and for information so as to access the encrypted contents according to the present invention and to decrypt encryption of the contents. In the header area 81 of the sector 85, held is such information used for those uses, which includes the sector number 84. Therefore, it is necessary to record the overall DVD sector of 2064 bytes into the large-capacity optical disk as disk image data for the DVD content.

Note that, actually in the physical sectors 80 each on a DVD disk, synchronization information (SYNC) 86 of 52 bytes and an error correction code (ECC) 87 of 302 bytes are added to the sector 85 of 2064 bytes, so that the physical sectors 80 each of 2418 bytes are constituted. When disk image data of a DVD content is handled on the hard disk 50 or the large-capacity optical disk 90 as user data, the synchronization information 86 and the error correction code 87 of large amounts are unnecessary, or they can also be added when recording is proceeded by the optical disk device 60. Therefore, excluding those, only 2064-byte data of the sector 85 is recorded here. Because of this, the recording capacity for the disk image data can be reduced by some fifteen percent.

In the large-capacity optical disk, a packet composed of 188 bytes is used as the minimum data unit for the access to content data in an application layer that handles image data and sound data. The MPEG2 standard is applied to handling-procedures for compression of the image data and for a compressed data stream, and the minimum data unit used here is the packet of 188 bytes. Also in the present invention, the packet is used for the data management, which enables consistent handling-procedures for the contents to be handled in the overall recording-reproducing system, so that simplification of the system is achieved.

Figure 8:
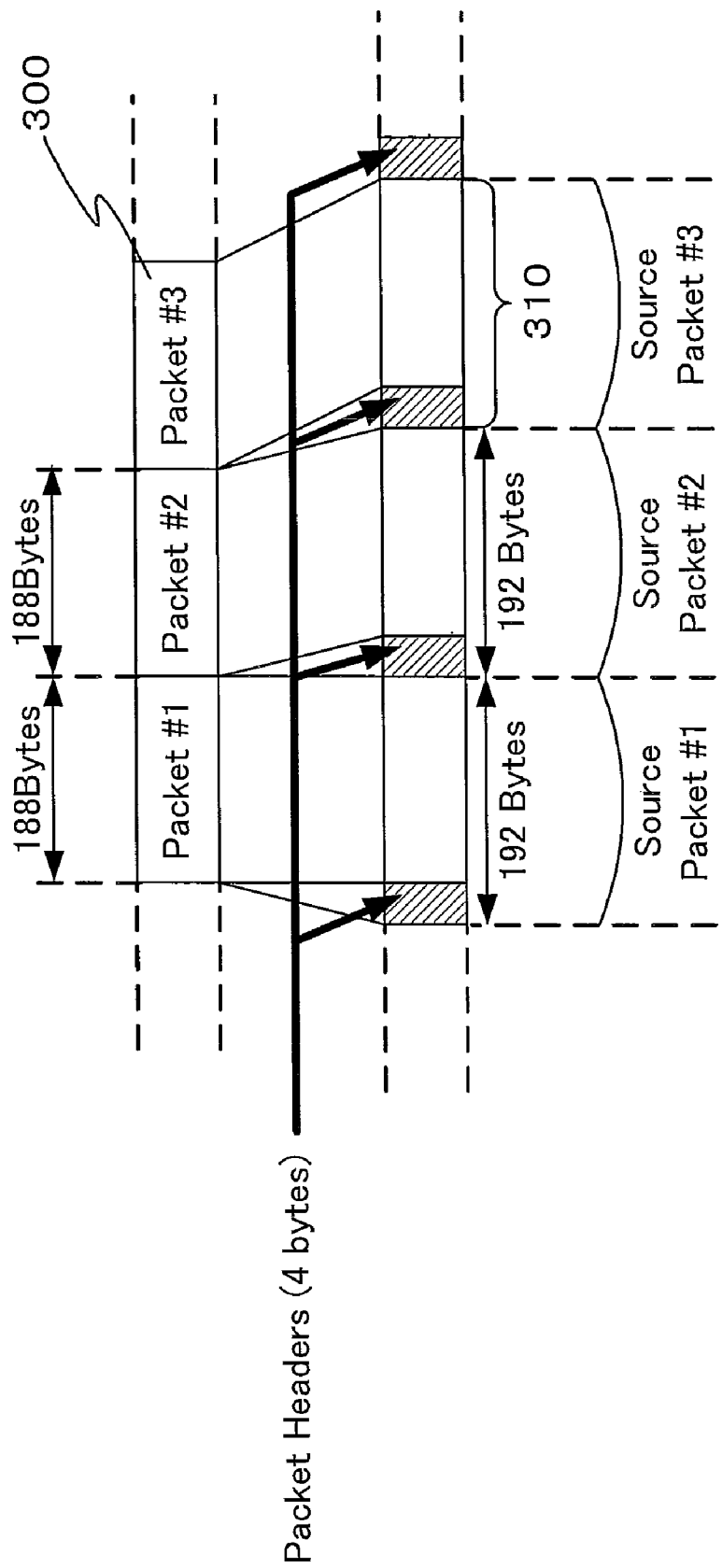
FIG. 8 is a diagram showing a configuration of source packets.

In FIG. 8, the appearance is shown so that a packet header being packet's management information is added to packets 300 each so as to constitute source packets 310. The packet header includes is a number that enables, if at all the packets become out of order, rearranging them to their former alignment. In addition, by adding the packet header of four bytes to each packet 300 having 188 bytes so as to form 192 bytes, the alignment can be achieved on the basis of a finer unit with a 2048-byte sector that is the recording unit on the disk. This configuration is also applied to the format for the large-capacity optical disk.

Here, the explanation will be made for an arrangement method in which sectors each of a DVD and an access unit of the large-capacity optical disk can be coincided with each other as fine as possible. In the arrangement method, by conforming in accordance with a predetermined rule, the sector boundaries of DVD content data that is accommodated in a disk image file and the access unit of the large-capacity optical disk into which the disk image file is written, an access to target sectors accommodating the DVD content data is made easy when the large-capacity optical disk is played back by the playback apparatus. Namely, in a case of reproducing a DVD content recorded in the large-capacity optical disk, when an access target sector specified at the time of a DVD content reproduction is calculated whether which source packets on the large-capacity optical disk are correlated with, the address calculation required for the access is made easy by providing a relationship that the correspondence relationship among ECC blocks for the DVD content and ECC clusters of contents for the large-capacity optical disk can be converted by a simple ratio of integers to the extent possible.

According to the method, in the large-capacity optical disk 90, a rule is simplified when the sector boundaries of the DVD content data that is accommodated in a disk image file, and the access unit of the large-capacity optical disk into which the disk image file is written are conformed to the predetermined rule, so that the access to the target sector accommodating the DVD content data is made easy when the large-capacity optical disk is played back by the playback apparatus.

Figure 9:
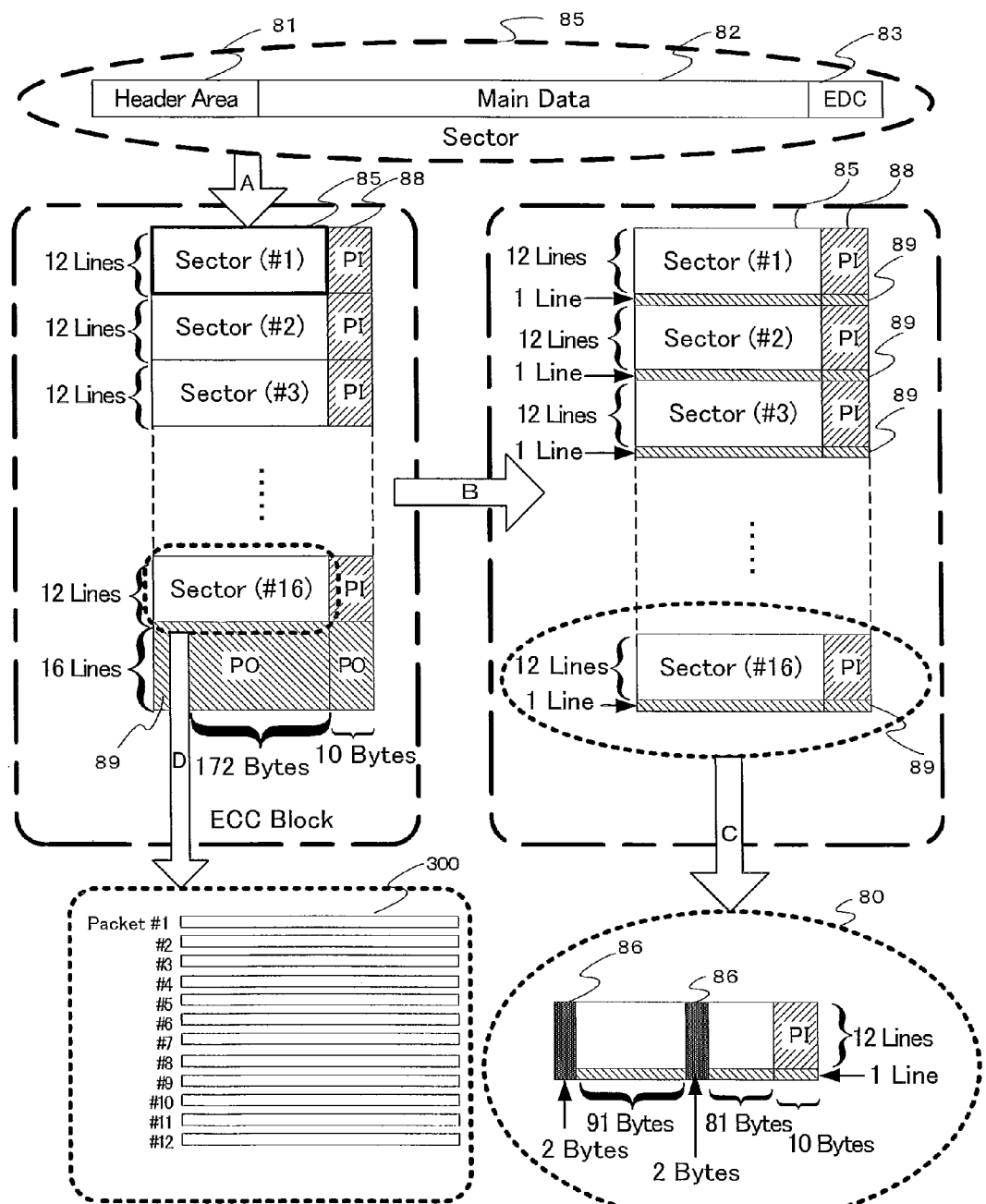
FIG. 9 is a diagram for explaining a configuration of sectors each, a physical sector and an ECC block of a DVD, and a storing method into packets.

In FIG. 9, shown are a configuration of sectors each and a physical sector of the DVD 70, and an ECC block being an access unit for the DVD 70, handling-procedures of data in the areas, and a storing method into packets. In the portion surrounded by the short dashed line in the upper part of FIG. 9 and indicated as a "Sector," shown is the structure of the sector 85, which is constituted of the header area 81, the main data 82 and the EDC 83 as already described in FIG. 7.

First, by following along the arrow A, an ECC block is constituted by gathering sixteen sectors. As indicated in the portion surrounded by alternate long and short dashed lines in the middle-left part of the figure and stated as an "ECC Block," first, data of the sectors each is placed in a juxtapositional manner of 172 bytes×12 lines, and a matrix of 172 bytes×192 lines is constituted using data of the sixteen sectors. With respect to the lines each of the matrix, inner parity codes (PI) 88 each having ten bytes are produced and then added to the back end of the respective lines. Next, with respect to the columns each of the matrix having 182 bytes× 192 lines including the inner parity codes (PI) 88, outer parity codes (PO) 89 each having sixteen bytes are produced and then added to the back end of the respective columns.

Next, by following along the arrow B in the figure, as shown in the portion surrounded by alternate long and short dashed lines in the middle-right part of the figure, an interleave process is performed in which the outer parity codes (PO) 89 produced in a total of sixteen lines are divided on a one-line by one-line basis, which is moved toward the last line of the sectors each so as to be inserted therebetween. Among the ECC blocks interleaved with the "PO," data recorded in one physical sector is a total of 182 bytes×13 lines including the sector 85 of the amount of 172 bytes×12 lines and the inner parity codes (PI) 88, and the outer parity codes (PO) 89 of the amount of 182 bytes×1 line. As to each of the physical sectors, a total of 302 bytes including the inner parity codes (PI) 88 of 120 bytes, and the outer parity codes (PO) 89 of 182 bytes are for the error correction code (ECC) 87 that has been explained referring to FIG. 7.

Next, by following along the arrow C in the figure, as shown in the portion surrounded by the broken line in the lower-right part of the figure, each of the thirteen lines described above is divided into two portions, and each of the physical sectors 80 is constituted by inserting at the front end and at the center thereof such synchronization information 86 that has the corresponding length of two bytes for each thereof. As a result, each of the lines has 186 bytes in length. Each of the lines is thus called as a synchronization frame. Data of the ECC blocks each formed as described above is recorded into the DVD disk while a recording modulation being given, in order from the front-end sector, one after another from the front-end synchronization frame of the sectors each.

Now, the explanation will be made below for a method that enables storing data of the sector 85 to be stored in the DVD as described above in a form suitable for the large-capacity optical disk into which the data is stored in the form of packets. In Embodiment 1, only the data portion in the sector 85 among the respective physical sectors 80 is recorded as disk image data of a DVD content.

By following along the arrow D in the figure, as shown in the portion surrounded by the broken line in the lower-left part of FIG. 9, the lines of the sector 85 of 172 bytes×12 lines, each of which data corresponds to one synchronization frame, are stored into the respective twelve packets 300 each having 188 bytes in length. In each of the packets, sixteen bytes are left as a fraction.

According to the manner described above, all of such sectors 85 that form the ECC block are divided under the same rule and are stored into the packets 300. By packing as described above, the processes can be performed using the shortest access unit called as the sector 85, so that the control can be simplified to a great extent. In addition, because the disk image data is stored into the packets 300 on a synchronization-frame unit basis, even in a case of recording performed for the HDD 50 or the large-capacity optical disk 90, a data processing unit for the DVD coincides with a processing unit for the HDD 50 and the large-capacity optical disk 90, so that an advantage in simplifying an access control is produced. All of data of each sector 85 can be stored into twelve of the packets 300, so that fraction bytes in each of the packets can be made available for utilization as control information for the content management, as will be described below.

Figure 10:
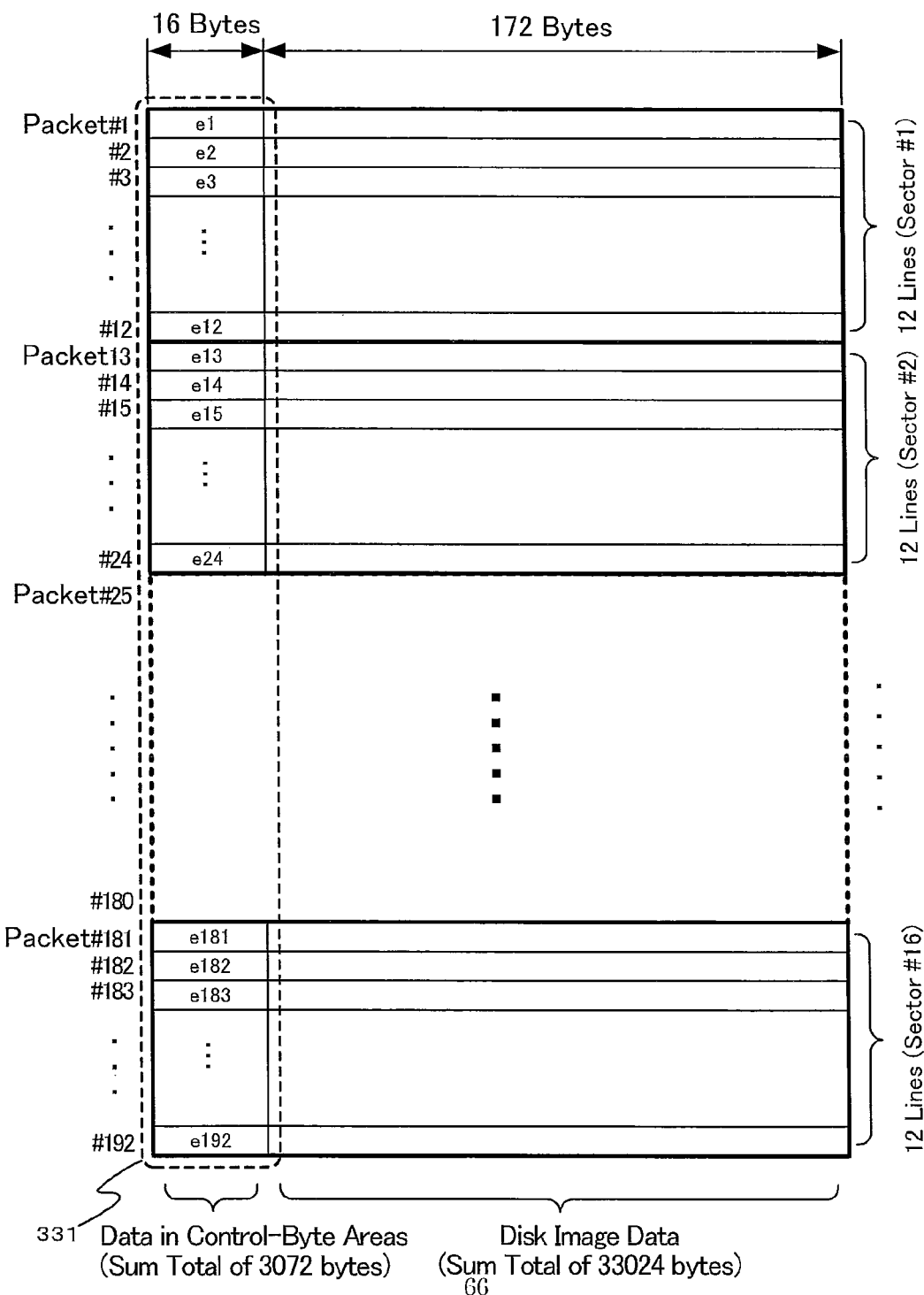
FIG. 10 is a diagram showing a configuration of packets.

In FIG. 10, a configuration is shown in which 2064-byte data of the sector 85 is stored into the packets 300. Data of the 172-byte data within one sector, corresponding to one-line synchronization frame, is stored into one packet, and the data of one sector is stored into twelve packets. At this time, the sixteen-byte fraction being left in each of the synchronization frames is used for an area to store the control information. In the DVD format, sixteen sectors are collectively given as an ECC block, so that 192 packets correspond to one ECC block. As described above, by storing data in the one-line synchronization frame into one packet, a unit of the disk image data coincides with a unit of the packets each not only for a sector being the access unit, but also for an ECC block, so that, at the time of content reproduction, access to the beginning is made easy to a large extent. The sixteen-byte fraction as remained in each packet collectively results in 192 bytes per sector, 3072 bytes per ECC block. These are utilized collectively for each sector as control-byte areas in which control information for accessing and the like is stored.

Byte names in the control-byte areas are numerically designated as shown in the figure. With respect to the front-end byte of each of the packets constituting an ECC block, the numerical designation is given one after another as e1, e2, e3, . . . from the front end being the first packet #1, and the numerical designation is given until a control byte e192 for the last packet #192. Functions of the respective bytes in the control-byte areas configured as described above will be explained later by referring to FIG. 13.

Figure 11:
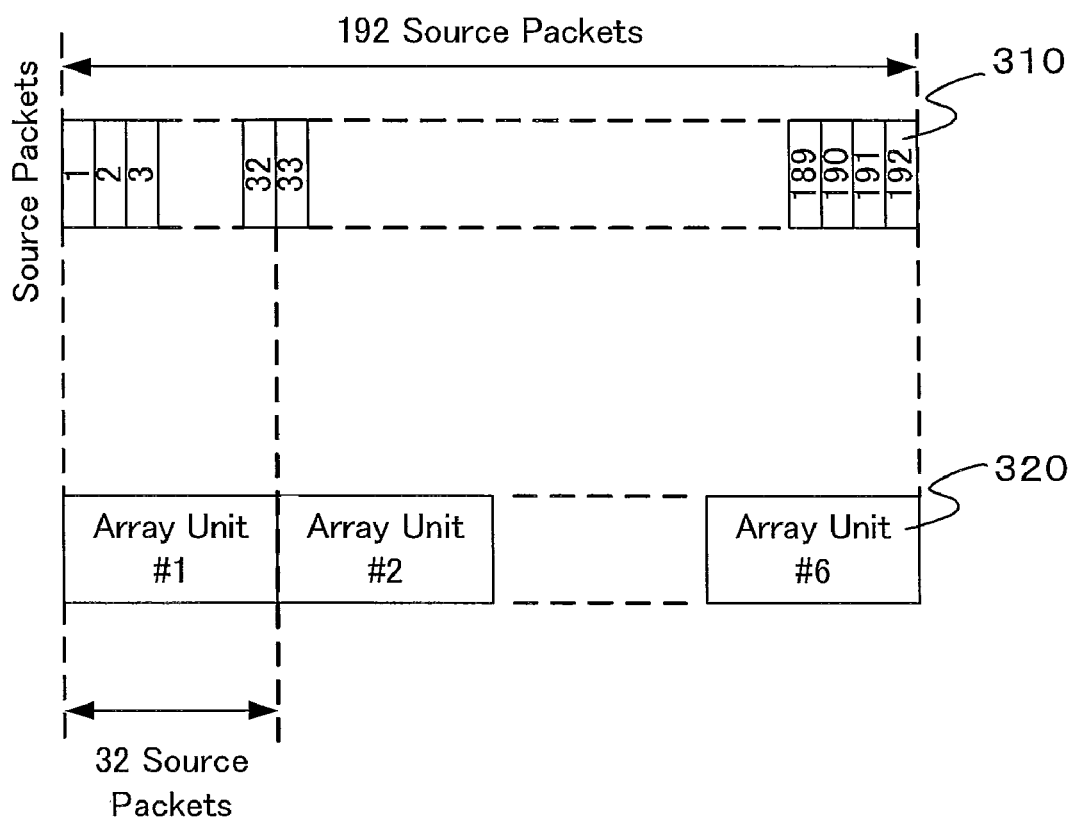
FIG. 11 is a diagram showing a configuration of array units.

In FIG. 11, a configuration of array units 320 each gathering the source packets 310 is shown. One of the array units is constituted of thirty-two of the source packets. Six of the array units are constituted of the 192 source packets that are configured with data of sixteen sectors.

Figure 12:
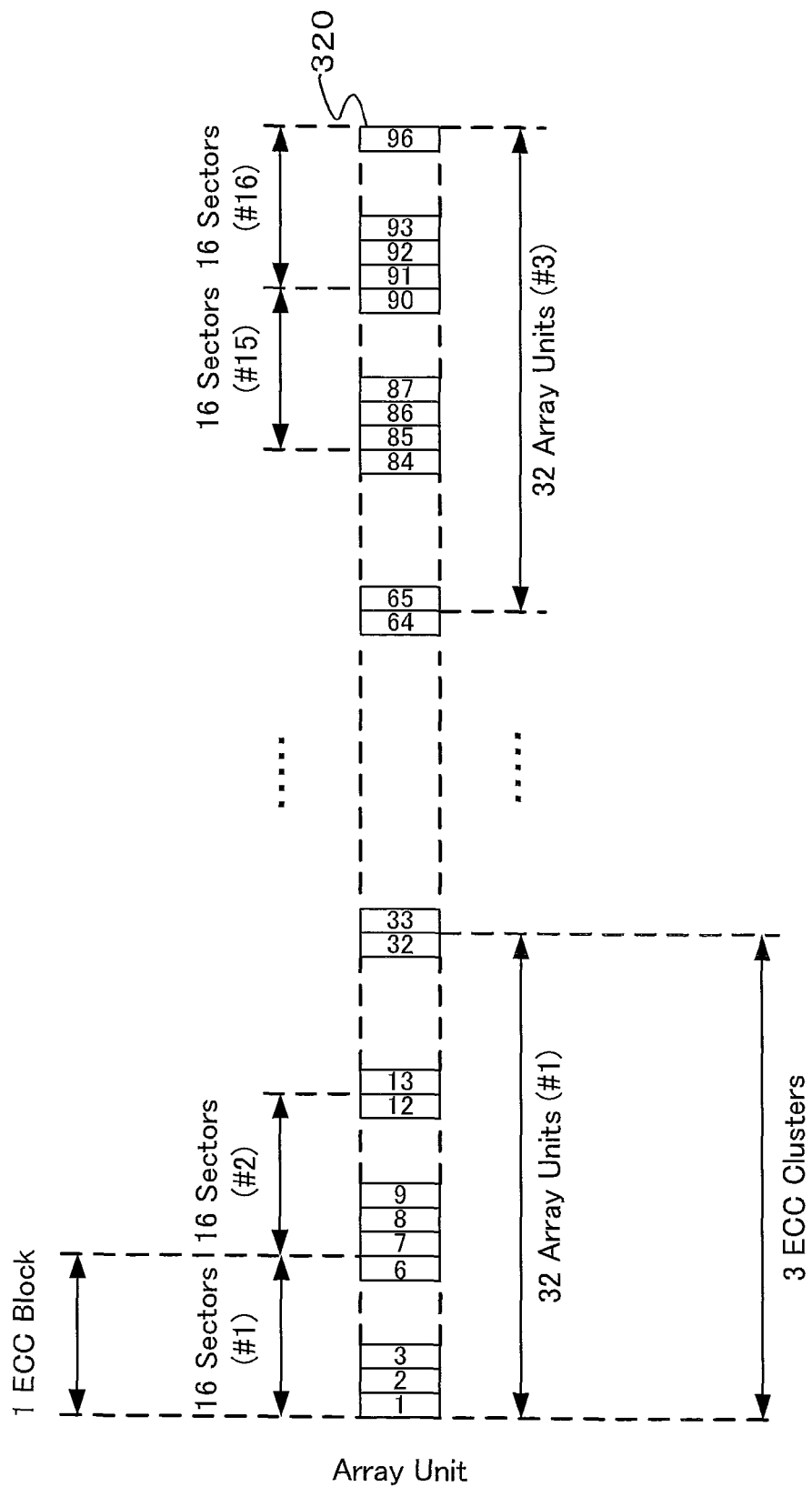
FIG. 12 is a diagram illustrating the relationship among the array units, an ECC block of a DVD, and ECC clusters of a large-capacity optical disk.

In FIG. 12, illustrated is the relationship among the array units 320, an ECC block being an access unit of a DVD, and ECC clusters each being an access unit of a large-capacity optical disk. As shown in the figure, the boundaries of ECC blocks, which include a set of sixteen ECC blocks each constituted of sixteen sectors, namely, the sixteen ECC blocks (the amount of 256 sectors) of the DVD as a unit, coincide with the boundaries of ECC clusters, which coincide with three sets of three of three ECC clusters constituted of the thirty-two array units, namely, nine ECC clusters (the amount of 288 sectors) of the large-capacity optical disk. Disk image data for the DVD content is stored here by 2064 bytes×16× 16=528,384 bytes, and for the large-capacity optical disk, the amount of user data including the fractions of the packets and packet headers is 2048 bytes×32×9=589,824 bytes.

As described above, in a case of reproducing DVD contents each recorded in the large-capacity optical disk, when which source packet on the large-capacity optical disk corresponds to an access target sector to be specified at the time of a DVD content reproduction is calculated, sixteen ECC blocks for the DVD content coincide with nine ECC clusters of the large-capacity optical disk, whereby the relationship that enables the conversion by above-described very simple ratio of integers has been formed, so that an address calculation required for the accessing is further made easy. If a data rate at the time of content reproduction is 10 M bits per second, some 0.5 M bytes of the data described above correspond to an image of less than 0.4 second, which is in a sufficient range as the time-resolution at the time of the accessing. Note that, data can also be independently read out on an ECC-cluster unit basis, so that the access is allowed in the degree of finer time accuracy. This packing system is called as a sixteen-sector mode.

In FIG. 13, a configuration of a control-byte area is shown. The control-byte area shown in FIG. 13 gathers, on a basis of the individual sectors, the bytes that are distributed in the packets each by the amount of sixteen bytes. In addition, by making use of a feature in which a packet and a sector, and the packet and a synchronization frame are correlated one-to-one with each other, added is the information that indicates attributes of sectors that store the packets, and of synchronization frames on the basis of the individual sectors.

Also in FIG. 13, definitions of the first or front-end sector parameters in the control-byte area are written side by side. Note that, from a second sector onward the same parameters are also laid out in the same order as the byte arrangement in the front-end sector. The control-byte area is completed by the amount of twelve synchronization frames having sectors each as a unit, and indicates the information related to each of the sectors and synchronization frames. Although all of the sectors belonging to an ECC block have the same configuration, as a representative example in FIG. 13, cases of the front-end sector, namely, the definitions of the control bytes from the e1 to e12 are stated. From the second sector onward the same parameters are also laid out in the same order as the byte arrangement in the front-end sector. Note that, the name "ek.n" of the respective control bytes indicates an n-th byte in the entire control bytes "ek" of a k-th sector in the ECC block. Here, the parameter k is an integer from one to 192, and the parameter n is an integer from one to sixteen.

In control bytes "ek.1 through ek.4" (four bytes each) of the synchronization frames, a sector number (three bytes) of the sector and a synchronization frame number (one byte) are stored. Because the sector number of the DVD is twenty-four bits, which results in being contained in the three bytes. In addition, the synchronization frame number is numerically designated from the synchronization frame #1 at the front end of the sector to the synchronization frame #12 at the back end thereof.

In control bytes "ek.5 through ek.8" (four bytes each), the forty-eight bytes are integrally handled with respect to the control bytes "ek.5 through ek.8" of all of the twelve synchronization frames as surrounded by the thick outline, and content identification codes are stored. The content identification codes can store a content-provider identification code, an identification code for content titles each, and a content distribution-process identification code so that a content provider is enabled to individually identify the content.

As to control bytes "ek.9 through ek.12" (four bytes each), a packet identification code "ID" (one byte), "Area" (one byte) that indicates an area to which the sector belongs, "Scp" (one byte) that indicates an encryption state of the sector, and a reserved area (one byte) are stored in this order.

The control byte "Area" indicates in which of the areas out of a lead-in area, a file-system-1 area, a user-file area, a file-system-2 area and a lead-out area, a sector of the disk image exists in a disk format of a DVD. Because it is immediately determined by the control byte "Area" whether the sector of the disk image data to be accessed is for data of a portion corresponding to the lead-in area of the DVD, a user's access that has no right to access to the area is made invalidated so as to prevent an unauthorized access, so that copyright protection can be strengthened.

The control byte "Scp" indicates whether or not the sector 85 of the disk image data is a sector that is encrypted by the CSS. The sector 85 to be accessed is immediately determined whether or not the sector is encrypted by the CSS, so that at the time of decryption, efficiencies in processing can be increased.

In control bytes "ek.13 through ek.16" (four bytes each), as surrounded by the thick outline, the forty-eight bytes are integrally handled with respect to the control bytes "ek.5 through ek.8" of all of the twelve synchronization frames, and information related to the amount of disk image data for the DVD contents and to an arrangement when the data is recorded in the large-capacity optical disk, and in particular, to an ECC cluster number "C" (eight bytes) in which the sectors are stored is stored.

According to the control bytes "C," an ECC cluster number correlating with an access target sector on the large-capacity optical disk can be known on a basis of the individual sectors, so that a finer access control on a basis of the individual sectors is possible. It is possible to enhance an access capability at the time of content reproduction, and to advance, in a case of performing various kinds of particular playback, access capabilities such as speed and smoothness at the time of "fast-forward" or "fast-backward," speed of a "skip" and a "jump," shortening of access time to the beginning of a desired portion, and the like.

Among the control bytes explained above, "ek.1 through ek.4," "ek.5 through ek.8" and "ek.9 through ek.12" corresponding from the first byte to the twelfth byte are those added when the content provider produces the disk image data. Rewriting by the recording apparatus 3 to descriptions of the data having been produced and distributed by the content provider is disabled.

In addition, as for the control bytes "ek.13 through ek.16," the data descriptions are produced and then specified when recording is performed to the recording medium targeted for the recording by the recording apparatus 3. In the data having been downloaded, these parts of the control bytes can only be rewritten by the recording apparatus 3. Here, when the recording medium is either the large-capacity optical disk 90 or the hard disk 50, production and recording of those control bytes are carried out; however, when the recording medium is the DVD 70, it is not necessary to record all of those control bytes, resulting in not recording them on the DVD 70.

As to the data in the packets 300 described above, whether or not rewriting is disabled when recording is performed by the recording apparatus 3 differs depending on property or an attribute of the control bytes in the packets. However, even in any of the packets 300, it is so arranged that rewriting of data descriptions is disabled from the first byte to the twelfth byte, but data descriptions from the thirteenth byte to the sixteenth byte by the recording apparatus 3 are specified so as to be written by the recording apparatus 3. The handling whether rewriting of the data descriptions is disabled or enabled when recording is performed by the recording apparatus 3 is uniformed according to arranged positions of the control bytes, whereby the recording control can be simplified, resulting in an unauthorized modification of the apparatus can be easily prevented.

In FIG. 14, an example of a functional layout is shown with respect to the control bytes from the fifth to the eighth bytes "ek.5 through ek.8" of each sector. For example, a total of the forty-eight bytes include four bytes for the content-provider identification, four bytes for a content-title identification code, twenty-four bytes for the content distribution-process identification code, and sixteen bytes for a modification detection code so as to detect modification of the control bytes. According to the manner described above, four hundred million or more items are available for content providers, and four hundred million or more, for titles of content providers. Moreover, as an identification code that enables individually specifying a distribution destination or a transaction condition for each content distribution-processes, or the like, the content distribution-process identification code can handle 10 to the power of 57 or more items, so that an enormous number of items are available for case numbers when processes are individually distinguished; therefore, an individual management of the content distribution destination can be taken without any difficulty in practical use.

In addition, the modification detection code is given so as to obtain a value specified in advance when a predetermined calculation is performed with respect to the entirety or a specific portion of the control bytes "ek.5 through ek.8" of the forty-eight bytes for each sector, and at this time, by keeping a predetermined calculation rule concealed by the content providers when a modification detection code is produced, the detection is enabled when a modification process other than authorized processes has been caused to these control bytes or when a falsified modification detection code is added. The calculation rule for decrypting a modification detection code is required to be incorporated into a commercially-available playback apparatus, so that the calculation rule is, after having been protected as needed, then supplied to a designer of the apparatus.

By making an arrangement as described above, it becomes possible to distinguish an unauthorized content by a user's playback apparatus or a verification apparatus of a content providers, for example, when an unauthorized copy is made by modifying the content distribution-process identification code, or improper decoding is done by falsifying an origination, or the like. Note that, as to the predetermined calculation rule for producing and decrypting the modification detection code, publicly known encryption technologies with high reliability and strength are in practical use in a number of ways, so that those are applicable.

By specifying the identification codes as described above, the identification can be carried out, by reading on "ek.1 through ek.4" and "ek.5 through ek.8" of each sector, in which data sector in what DVD content the disk image data belongs to or to which user it is distributed.

That is to say, by managing the distribution-process identification code as a value of an identification code for a distribution destination so that a process to perform the content distribution can be individually identified on the side of a content provider, it becomes possible to manage on a basis of the individual sectors when and to which destination data of a certain DVD content is distributed.

The information described above can be utilized to trace, when an unauthorized copy or unauthorized alteration has been carried out, a distribution destination where such an unauthorized act has been directed, resulting in contributing to strengthening a content-provider's copyright protection.

In FIG. 15, illustrated is the correspondence relationship among sector numbers of DVD contents and ECC cluster numbers of the large-capacity optical disk storing those sectors.

As an example, the amount of DVD contents in a first-layer data area is 16×8256=132,096 that gives the number of ECC blocks in multiples of sixteen, 132,096×16=2,113,536 as the number of sectors, and some 4.3 G bytes as the recording capacity. Sector numbers of the area are from 30000h to 233FFFh. If the amount of a second-layer data area is the same, sector numbers of the second-layer data area are from DCC000h to FCFFFFh where the respective sector numbers of the first-layer data area are bit-inverted. Note that, the ECC block numbers of the first-layer data area are given from 3000h to 233FFh, and the ECC block numbers of the second-layer data area, from DCC00h to FCFFFh.

It is presumed that ECC clusters for the large-capacity optical disk corresponding to the ECC blocks for the DVD contents in the first-layer data area begin with the ECC cluster number Ph=100000h on the disk. The number of the ECC clusters corresponding to the number of the ECC blocks 132,096 is 9×8256=74,304, so that ECC cluster numbers of the area are given from 100000h to 11223Fh. In addition, when an ECC cluster in a second-layer data area is so arranged that files thereof are recorded to continue from the final ECC cluster in the first-layer data area, the number of the ECC clusters is the same as 9×8256=74,304, so that the ECC cluster numbers are given from 112240h to 12447Fh.

Similarly, in other areas such as a lead-in area, it is possible to specify the relationship among the sector numbers for DVD contents each and ECC cluster numbers for the large-capacity optical disk storing those sectors.

The ECC cluster number "C" being a parameter shown as the control bytes "ek.13 through ek.16" in FIG. 13 so as to store sectors of disk image data for the DVD contents is calculated from the correspondence relationship described above, and is stored into the control bytes of respective sectors.

As described above, the alignment among the ECC block boundaries and the ECC cluster boundaries can be achieved in short intervals, and at the same time, the ECC cluster number "C" calculated here is held as the control bytes of the individual sectors, so that a finer access control to the disk can be easily and quickly executed.

In the above explanation in the embodiment, although the explanation has been made for the method in which the DVD contents are distributed by a download from the content server 1 to the user's recording apparatus 3 so as to be recorded thereinto, it is not always necessary that, in applying the present invention, recording into an optical disk is performed on the user's side. It is also applicable for the content-provider itself to supply the large-capacity optical disk 90 after having the recording done thereinto.

In addition, a type of the large-capacity optical disk used is not always limited to a recordable disk that can be recorded by the optical disk device. When the content provider itself records in a large-capacity optical disk and supplies it, it is also applicable to produce a disk for supply by applying the format of the present invention to a large-capacity optical disk of the read-only-memory type. Reduction of disk costs can be achieved by collecting into one large-capacity optical disk than by using a plurality of current DVDs.

According to the present invention, as described above, it becomes possible to utilize for a download distribution, without re-authoring, the contents for DVD packaged media authored in the past.

In addition, a plurality of titles of the contents for DVD packaged media that the user has downloaded is made recordable in a large-capacity optical disk. At this time, costs to reprocess the contents by authoring can be reduced, so that the contents can be inexpensively supplied.

Moreover, at this time, the user can freely combine and record a plurality of titles of the contents to be recorded into the large-capacity optical disk.

In addition, the operations can be carried out even when a disk to be recorded is not determined in advance to be whether a large-capacity optical disk or the current DVD at the stage when the user downloads the contents, so that a user's usability is enhanced.

In addition, even in the large-capacity optical disk having recorded DVD contents in this manner, it is possible to enhance an access capability at the time of content reproduction, and to advance, in a case of performing various kinds of particular playback, access capabilities such as speed and smoothness at the time of "fast-forward" or "fast-backward," speed of a "skip" and a "jump," shortening of access time to the beginning of a desired portion, and the like.

Moreover, according to the present invention, a predetermined copyright-protection system for use in the large-capacity optical disk is applied to its protection, in addition to the predetermined system for the DVD, so that it becomes possible to strongly protect the copyright of contents.

In addition, with respect to the contents to be distributed by a download, the control information that enables individual management for respective target users is added, so that an unauthorized copy or an unauthorized alteration can be easily prevented, and strengthening copyright protection of the contents is realized.

Furthermore, these pieces of control information are added to the format so as to maintain compatibility with those objects for operational procedures and access capabilities of the download distribution described above, so that it becomes possible to mutually maintain compatibility with enhancement of a user's usability and strengthening the copyright protection of the contents.

What is claimed is:

1. An information recording method by which data of a DVD content having been distributed from a source to a recording apparatus by way of a communications channel is recorded into a recording medium, comprising:
    obtaining, at the source, content that complies with the DVD format,
    dividing data of the obtained DVD content into a plurality of transport stream packets such that:
        the transport stream packets include the divided data of each sector of the obtained DVD content, and each of the transport stream packets include control bytes; and
        the control bytes include a content identification code that enables uniquely identifying the content, and a distribution-process identification code that enables individually identifying a content distribution-process, whereby the identification is made possible on a basis of the individual sectors for the DVD content, for the content and for the content distribution-process;
    providing at least one of a hard disk and a large-capacity optical disk as a possible selection for the recording medium;
    when the recording medium is selected to be a hard disk or a large-capacity optical disk, performing the following:
        correlating sectors for the DVD content with recording positions on the recording medium so that an integral number of error correction code blocks complying with the DVD format coincides with an integral number of units of error correction codes in the large-capacity optical disk, and
        adding to a predetermined area in the control bytes of the transport stream packets, the sector number of the individual sectors for the DVD content, and arrangement information for identifying the recording positions of the sectors on the recording medium; and
    recording, by the recording apparatus, the transport packets into the recording medium, wherein:
    the obtained DVD content is distributed by the source to the recording apparatus via the communications channel either before or after the dividing step is performed, and
    the information related to the recording positions are added to the predetermined area in the correlating control bytes.

2. An information reproducing method being a method of reproducing a DVD content recorded in a recording medium by using the information recording method as set forth in claim 1, comprising the steps of:
    reading out from the control bytes, the content identification code, the distribution-process identification code and the modification detection code; and
    determining from the read-out information whether or not modification has been carried out on the identification codes; wherein
    when it is determined that the modification has been carried out, the playback of the recording medium is stopped.

3. An information reproducing method being a method of reproducing a DVD content recorded in a recording medium by using the information recording method as set forth in claim 1, comprising the step of:
    acquiring the sector number of a sector under playback and arrangement information therefrom when the DVD content is reproduced; wherein
    when the sector number of a sector to be played back next is detected during the reproduction of the DVD content, data of the sector to be reproduced next on the recording medium is accessed based on the sector number and the arrangement information.

4. An information recording medium comprising a large-capacity optical disk in which disk image data of a DVD content is recorded according to the method of claim 1, such that:
    data of the DVD content is divided into a plurality of transport stream packets so as to be stored on the basis of a unit to which an inner parity in an error correction code block complying with the DVD format is added;
    the transport stream packets each include data produced by dividing data of each of sectors for the DVD content, and control bytes; and
    a content identification code that enables uniquely identifying the content, a distribution-process identification code that enables individually identifying a content distribution-process, and a modification detection code produced from information including the distribution-process identification code are stored into the control bytes, so that the identification is made possible on a basis of the individual sectors for the DVD content, for the content and for the content distribution-process.

5. An information reproducing method being a method of playing back a large-capacity optical disk as set forth in claim 4, comprising the steps of:
    reading out from the control bytes, the content identification code, the distribution-process identification code and the modification detection code; and
    determining from the read-out information whether or not modification has been carried out on the identification codes; wherein
    when it is determined that the modification has been carried out, the playback of the large-capacity optical disk is stopped.

6. An information recording medium comprising a large-capacity optical disk in which disk image data of a DVD content is recorded according to the method of claim 1, such that:
data of the DVD content is divided into a plurality of transport stream packets so as to be stored on the basis of a unit to which an inner parity in an error correction code block complying with the DVD format is added;
the transport stream packets each include data produced by dividing data of each of sectors for the DVD content, and control bytes; and
the sector number of the individual sectors for the DVD content, and arrangement information for identifying recording positions of the sectors on the large-capacity optical disk are stored into the control bytes.

7. An information reproducing method being a method of playing back a large-capacity optical disk as set forth in claim 6, comprising the step of:
acquiring the sector number of a sector under playback and arrangement information therefrom when the DVD content is reproduced; wherein
when the sector number of a sector to be played back next is detected during the reproduction of the DVD content, data of the sector to be reproduced next on the large-capacity optical disk is accessed based on the sector number and the arrangement information.

8. An information recording method by which data of a DVD content having been distributed by way of a communications channel is recorded into a recording medium, comprising:
dividing data of the obtained DVD content into a plurality of transport stream packets such that:
the transport stream packets include the divided data of each sector of the obtained DVD content, and each of the transport stream packets include control bytes; and
the control bytes include a content identification code that enables uniquely identifying the content, and a distribution-process identification code that enables individually identifying a content distribution-process, whereby the identification is made possible on a basis of the individual sectors for the DVD content, for the content and for the content distribution-process; and
when the recording medium is a hard disk or a large-capacity optical disk, performing the following:
correlating sectors for the DVD content with recording positions on the recording medium so that an integral number of error correction code blocks complying with the DVD format coincides with an integral number of units of error correction codes in the large-capacity optical disk, and
adding to a predetermined area in the control bytes of the transport stream packets, the sector number of the individual sectors for the DVD content, and arrangement information for identifying the recording positions of the sectors on the recording medium, wherein:
the information related to the recording positions are added to the predetermined area in the correlating control bytes, and
a unit based on which the data of the individual sectors for the DVD content is divided into the transport stream packets is defined as a unit to which an inner parity in the error correction code blocks complying with the DVD format is added, and the number of the correlated error correction code blocks complying with the DVD format is made sixteen so that the integral number of units of the error correction codes in a large-capacity optical disk coincides with each other.

9. An information recording method by which data of a DVD content having been distributed by way of a communications channel is recorded into a recording medium, comprising:
dividing data of the obtained DVD content into a plurality of transport stream packets such that:
the transport stream packets include the divided data of each sector of the obtained DVD content, and each of the transport stream packets include control bytes; and
the control bytes include a content identification code that enables uniquely identifying the content, and a distribution-process identification code that enables individually identifying a content distribution-process, whereby the identification is made possible on a basis of the individual sectors for the DVD content, for the content and for the content distribution-process; and
when the recording medium is a hard disk or a large-capacity optical disk, performing the following:
correlating sectors for the DVD content with recording positions on the recording medium so that an integral number of error correction code blocks complying with the DVD format coincides with an integral number of units of error correction codes in the large-capacity optical disk, and
adding to a predetermined area in the control bytes of the transport stream packets, the sector number of the individual sectors for the DVD content, and arrangement information for identifying the recording positions of the sectors on the recording medium, wherein:
the information related to the recording positions are added to the predetermined area in the correlating control bytes,
when the recording medium is a DVD, the control bytes are deleted from data of the transport stream packets,
data handled as main data on sectors of the DVD and header information of the sectors are extracted,
the error correction code blocks complying with the DVD format are constructed based on the extracted data handled as main data and on the extracted header information, and
data of the error correction code blocks is recorded into the DVD.

* * * * *